(12) United States Patent
Itagaki et al.

(10) Patent No.: US 11,876,636 B2
(45) Date of Patent: *Jan. 16, 2024

(54) WIRELESS COMMUNICATION DEVICE

(71) Applicant: Sony Group Corporation, Tokyo (JP)

(72) Inventors: Takeshi Itagaki, Saitama (JP); Tomoya Yamaura, Tokyo (JP); Masanori Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 17/687,700

(22) Filed: Mar. 7, 2022

(65) Prior Publication Data
US 2022/0191056 A1    Jun. 16, 2022

Related U.S. Application Data

(63) Continuation of application No. 16/597,863, filed on Oct. 10, 2019, now Pat. No. 11,489,688, which is a
(Continued)

(30) Foreign Application Priority Data

Mar. 26, 2014    (JP) .................. 2014-063467

(51) Int. Cl.
*H04W 84/12* (2009.01)
*H04L 12/18* (2006.01)
(Continued)

(52) U.S. Cl.
CPC ....... *H04L 12/1868* (2013.01); *H04B 7/0452* (2013.01); *H04B 7/0697* (2013.01);
(Continued)

(58) Field of Classification Search
CPC . H04L 12/1868; H04L 5/0048; H04L 1/1854; H04L 5/0055; H04L 1/0041;
(Continued)

(56) References Cited

U.S. PATENT DOCUMENTS 8,929,286 B2    1/2015   Morioka et al.
9,014,205 B2    4/2015   Schmidl et al.
(Continued)

FOREIGN PATENT DOCUMENTS

CN    101296013 A    10/2008
CN    101461181 A    6/2009
(Continued)

OTHER PUBLICATIONS

Guoqing Li, Multiuser Blot:k ACK Request (MU-BAR), IEEE 802.11-15/1053r1, IEEE, <URL: https://mentortor.ieee.org/802, 11/dcn/15/11-15-1053-01-00ax-multiuser-block-ack-request-mu-bar.pptx>, Sep. 11, 2015.

(Continued)

*Primary Examiner* — Christopher R Crompton
(74) *Attorney, Agent, or Firm* — XSENSUS LLP

(57) ABSTRACT

[Object] To improve the reliability by using an acknowledgement response while using radio resources efficiently in multicast transmission over wireless transmission.
[Solution] A plurality of wireless communication devices included in a multicast group, when receiving a data frame, transmit simultaneously an acknowledgement response of multicast using spatial multiplexing in response to an acknowledgement request from a transmission source. On the other hand, a wireless communication device of the transmission source decomposes the acknowledgement responses simultaneously received into the original individual acknowledgement responses and restores them using (Continued)

signal processing based on information on a channel with each wireless communication device of a transmission destination.

9 Claims, 23 Drawing Sheets

Related U.S. Application Data continuation of application No. 15/122,574, filed as application No. PCT/JP2015/050071 on Jan. 5, 2015, now Pat. No. 10,484,191.

(51) Int. Cl.
| | |
|---|---|
| H04W 76/14 | (2018.01) |
| H04W 4/08 | (2009.01) |
| H04L 1/18 | (2023.01) |
| H04W 4/06 | (2009.01) |
| H04W 16/28 | (2009.01) |
| H04W 72/044 | (2023.01) |
| H04L 1/1829 | (2023.01) |
| H04W 72/30 | (2023.01) |
| H04B 7/0452 | (2017.01) |
| H04B 7/06 | (2006.01) |
| H04L 1/00 | (2006.01) |
| H04L 5/00 | (2006.01) |
| H04W 52/24 | (2009.01) |
| H04W 84/18 | (2009.01) |

(52) U.S. Cl.
CPC .............. *H04L 1/0041* (2013.01); *H04L 1/18* (2013.01); *H04L 1/1854* (2013.01); *H04L 5/0048* (2013.01); *H04L 5/0055* (2013.01); *H04W 4/06* (2013.01); *H04W 4/08* (2013.01); *H04W 16/28* (2013.01); *H04W 52/242* (2013.01); *H04W 72/046* (2013.01); *H04W 72/30* (2023.01); *H04W 76/14* (2018.02); *H04W 84/12* (2013.01); *H04L 12/189* (2013.01); *H04L 2001/0093* (2013.01); *H04W 84/18* (2013.01)

(58) Field of Classification Search
CPC . H04L 1/18; H04L 12/189; H04L 2001/0093; H04W 76/14; H04W 4/06; H04W 4/08; H04W 16/28; H04W 52/242; H04W 72/005; H04W 72/046; H04W 84/12; H04W 84/18; H04B 7/0452; H04B 7/0697
USPC .......................................................... 370/312
See application file for complete search history.

(56) References Cited

U.S. PATENT DOCUMENTS

| | | | | |
|---|---|---|---|---|
| 10,484,191 | B2 * | 11/2019 | Itagaki ................. | H04B 7/0697 |
| 11,489,688 | B2 * | 11/2022 | Itagaki ................. | H04B 7/0697 |
| 2005/0147023 | A1 * | 7/2005 | Stephens ............... | H04L 1/1685 370/203 |
| 2006/0268886 | A1 | 11/2006 | Sammour et al. | |
| 2008/0267133 | A1 | 10/2008 | Shida et al. | |
| 2009/0052363 | A1 | 2/2009 | Matsue et al. | |
| 2009/0279470 | A1 | 11/2009 | Seok | |
| 2010/0046457 | A1 | 2/2010 | Abraham et al. | |
| 2010/0202347 | A1 | 8/2010 | Sridhara et al. | |
| 2010/0220601 | A1 | 9/2010 | Vermani et al. | |
| 2010/0220654 | A1 * | 9/2010 | Wentink ................ | H04L 1/1854 370/328 |
| 2010/0220813 | A1 | 9/2010 | Abraham et al. | |
| 2011/0149918 | A1 | 6/2011 | Gong et al. | |
| 2011/0158159 | A1 | 6/2011 | Gong et al. | |
| 2012/0076073 | A1 | 3/2012 | Merlin et al. | |
| 2014/0161016 | A1 | 6/2014 | Morioka et al. | |
| 2014/0192742 | A1 | 7/2014 | Gong et al. | |
| 2017/0078070 | A1 | 3/2017 | Gong et al. | |
| 2021/0112557 | A1 | 4/2021 | Lee et al. | |

FOREIGN PATENT DOCUMENTS

| | | |
|---|---|---|
| CN | 102057608 A | 5/2011 |
| CN | 102318252 A | 1/2012 |
| JP | 2003-198556 A | 7/2003 |
| JP | 2007-517474 A | 6/2007 |
| JP | 2008-278205 A | 11/2008 |
| JP | 2009-49704 A | 3/2009 |
| JP | 2010-541392 A | 12/2010 |
| JP | 2011-146988 A | 7/2011 |
| JP | 2011-523811 A | 8/2011 |
| JP | 2011-526455 A | 10/2011 |
| JP | 2012-517780 A | 8/2012 |
| JP | 2012-523771 A | 10/2012 |
| JP | 2013-511911 A | 4/2013 |
| JP | 2013-512613 A | 4/2013 |
| JP | 2013-528015 A | 7/2013 |
| JP | 2013-197909 A | 9/2013 |
| JP | 5316208 B2 | 10/2013 |
| JP | 2013214900 A | 10/2013 |
| JP | 2013-542643 A | 11/2013 |
| JP | 2014-529952 A | 11/2014 |
| WO | 2012/173326 A1 | 12/2012 |
| WO | 2013/027019 A1 | 2/2013 |
| WO | WO-2013170136 A1 | 11/2013 |
| WO | 2015/146204 A1 | 10/2015 |

OTHER PUBLICATIONS

Kazuyuki Sakoda. Overall Protocol of UL MU BA for Multicast Transmission. IEEE 802.11-15/1043r1. IEEE, <URL: https/mentor. ieee.org/802.1/dcn/15/11-15-1043-01-00ax-overall-protocol-of-ul-mu-bafor-multicast-transmission.pptx>, Sep. 14, 2015.

Chinese Office Action dated Apr. 1, 2019, issued in corresponding Chinese Patent Application No. 201580014632.6.

Extended European Search Report dated Oct. 16, 2017 in corresponding European Patent Application No. 15769199.9, 18 pages.

International Search Report dated Mar. 17, 2015, in PCT/JP2015/050071 filed Jan. 5, 2015.

Jinyoung Chun et al., Uplink Multi-User Transmission, IEEE 802.11-13/1388r0, IEEE mentor, Nov. 11, 2013.

* cited by examiner

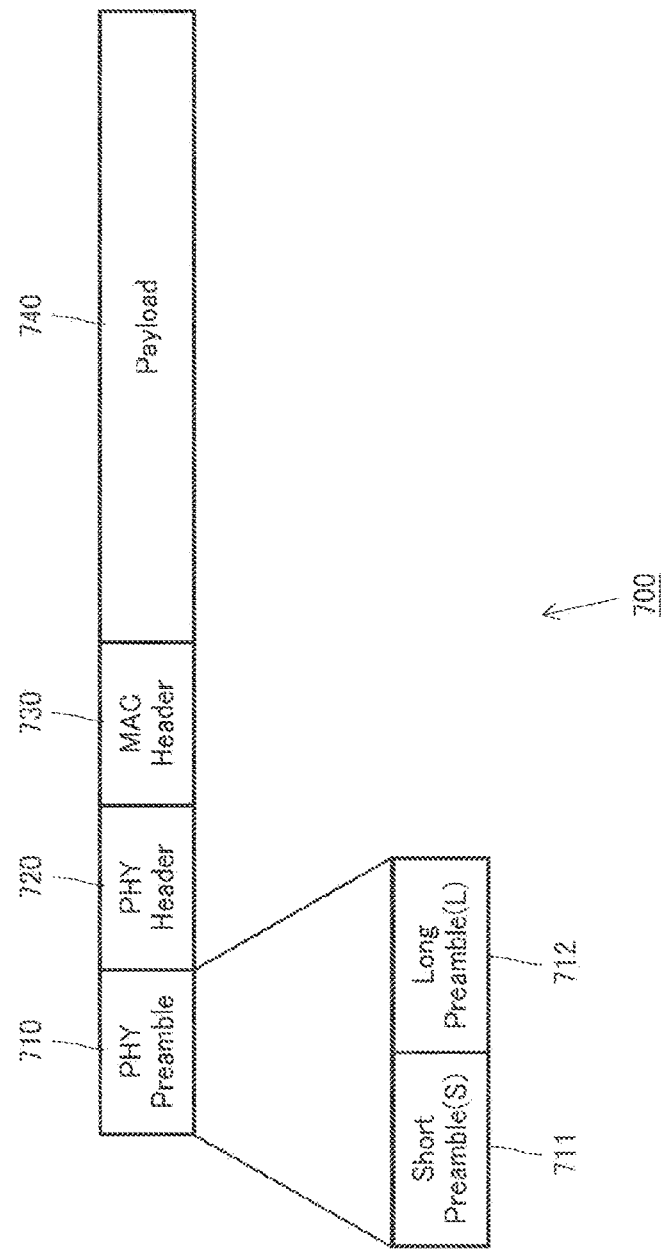

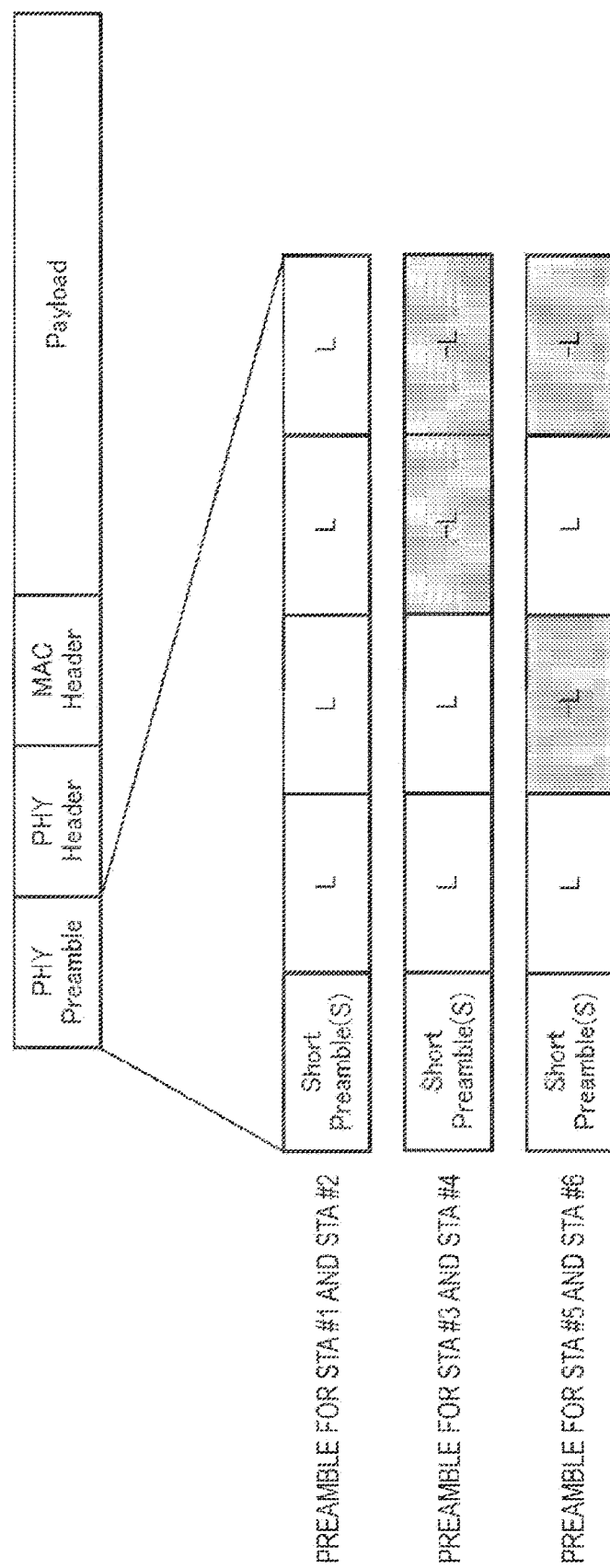

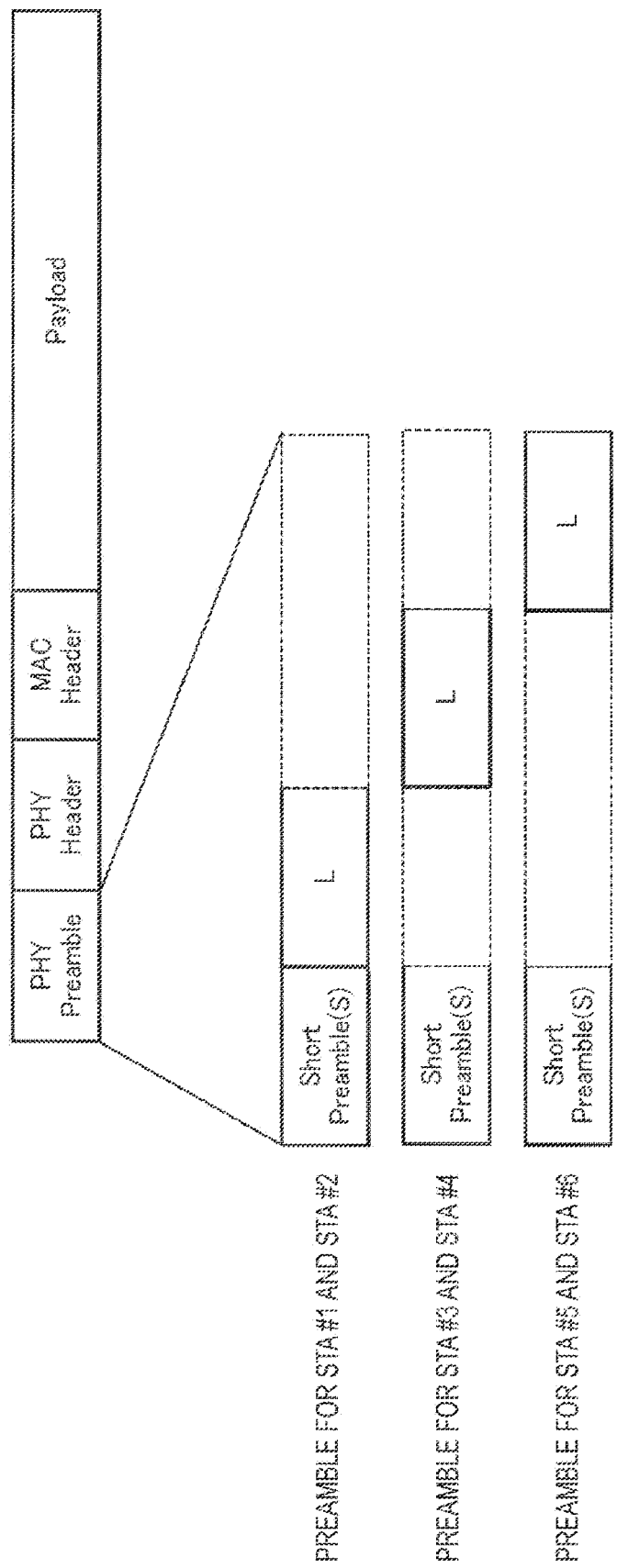

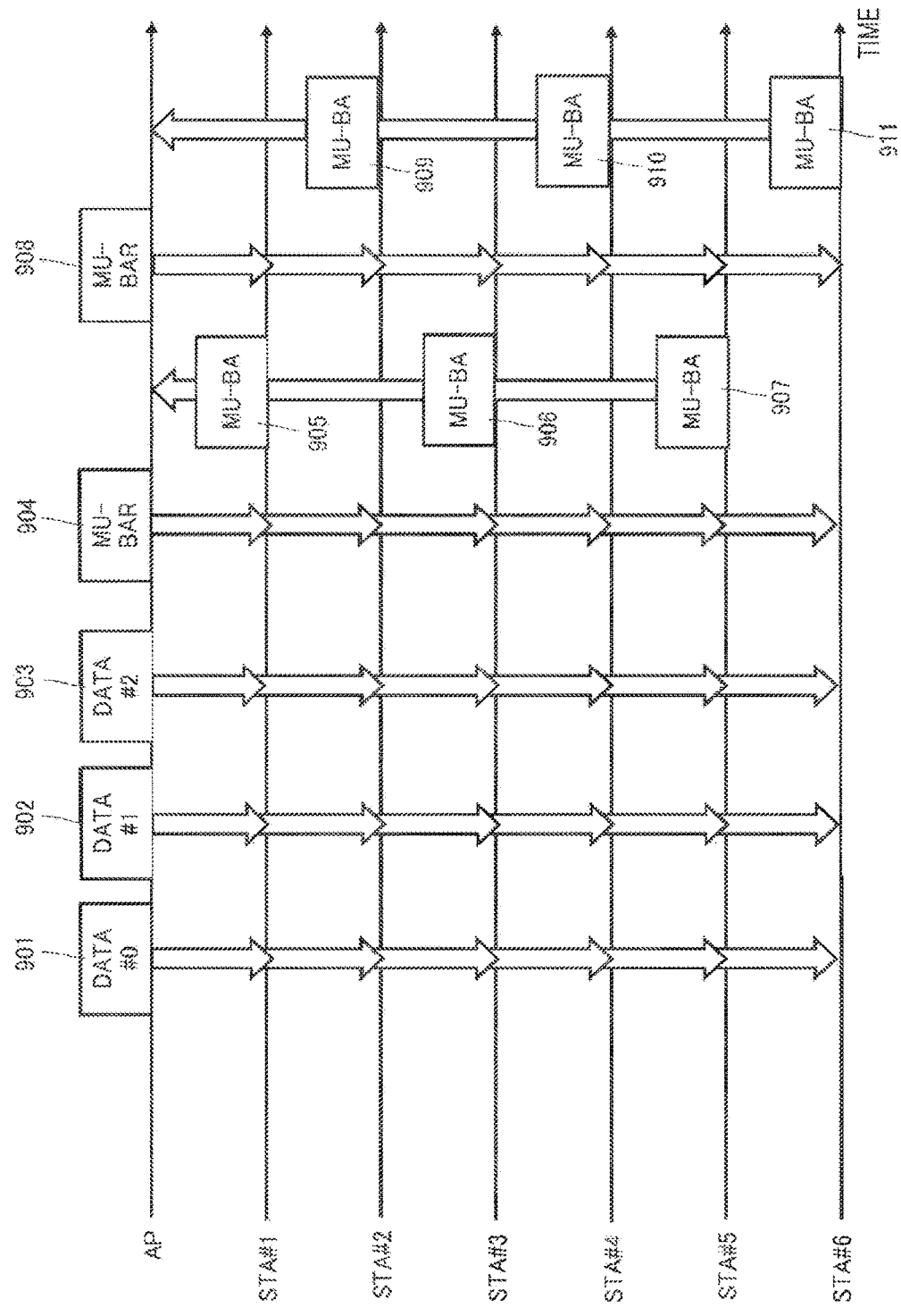

WIRELESS COMMUNICATION DEVICE

CROSS-REFERENCE TO RELATED APPLICATIONS

The present application is a continuation of U.S. application Ser. No. 16/597,863, filed Oct. 10, 2019, which is a continuation of U.S. application Ser. No. 15/122,574, filed Aug. 30, 2016 (now U.S. Pat. No. 10,484,191), which is based on PCT filing PCT/JP2015/050071, filed Jan. 5, 2015, which claims priority to JP 2014-063467, filed Mar. 26, 2014, the entire contents of each are incorporated herein by reference.

TECHNICAL FIELD

The present technology disclosed herein relates to a wireless communication device that performs multicast transmission.

BACKGROUND ART

When data having the same content is intended to be transmitted to a plurality of wireless slave stations, multicast that is independent of the number of transmission destinations is more efficient than unicast in terms of resource utilization efficiency.

As one example, the basic protocol for multicast transmission is defined in "IEEE Standard 802.11-2012" that is IEEE 802.11 WLAN standard specification. However, the receipt from a plurality of devices fails to be confirmed in the protocol defined in this standard, and thus it may be impossible to improve the communication quality by retransmission control using the acknowledgement.

In the "IEEE802.11aa-2012" that is an amendment standard, the multicast extension with acknowledgement is defined, and the effect of improving the communication quality by retransmission control using the acknowledgement is introduced. However, in this extension method, the acknowledgement of multicast is performed individually for each group or member. Thus, with the increase in the number of terminals to be transmitted by multicast, the overhead due to the use of communication resources increases, resulting in the limit of the resource utilization efficiency that is an advantage of multicast.

A protection mechanism for multi-user MIMO communication that allows a reservation message to be transmitted to a plurality of devices simultaneously by multicast and allows the plurality of devices to transmit each confirmation message on a channel simultaneously in response to the reservation message thereby multiplexing the confirmation messages is developed (e.g., refer to Patent Literature 1). However, the spatial multiplexing in the protection mechanism is achieved on condition that the contents of the confirmation messages to be used are all the same. In other words, the protection mechanism as described above may be not applicable to a frame that is likely to have different contents for each terminal such as confirmation of receipt of multicast data.

CITATION LIST

Patent Literature

Patent Literature 1: JP 2013-528015T

SUMMARY OF INVENTION

Technical Problem

The present technology described herein is intended to provide an excellent wireless communication device that is capable of improving the reliability by using an acknowledgement response while using radio resources efficiently in multicast transmission over wireless transmission.

Solution to Problem

The present application has been made in view of the above problem. A technology according to claim 1 of the present application is a wireless communication device including: a communication unit configured to communicate wirelessly with a plurality of slave stations under control; and a controller configured to control data transmission with each of the slave stations via the communication unit. The controller allows the communication unit serving as a master station to perform multicast transmission to the plurality of slave stations and to request an acknowledgement for the multicast transmission from the slave station, and the communication unit performs a process of receiving an acknowledgement response simultaneously transmitted from the plurality of slave stations.

According to a technology according to claim 2 of the present application, in the wireless communication device according to claim 1, the controller requests an acknowledgement selectively from among the slave stations participating in a multicast group transmitted by multicast.

According to a technology according to claim 3 of the present application, in the wireless communication device according to claim 1, the controller specifies one of a slave station transmitting an acknowledgement response frame and a transmission scheme of the acknowledgement response frame via the communication unit, and the communication unit separates a plurality of acknowledgement response frames received simultaneously from the plurality of slave stations on a basis of information on a propagation path between the plurality of slave stations and the wireless communication device.

According to a technology according to claim 4 of the present application, the specification of the transmission scheme includes an encoding scheme of a training signal of the acknowledgement response frame used to form a format capable of separating the frames transmitted simultaneously from the plurality of slave stations using calculation, and in the wireless communication device according to claim 3, the communication unit acquires the information on the propagation path between each of the slave stations and the wireless communication device from the training signal transmitted from each of the slave stations in accordance with the encoding scheme.

According to a technology according to claim 5 of the present application, in the wireless communication device according to claim 3, the specification of the transmission scheme includes information on a combination of a modulation method and error correction coding for the acknowledgement response frame.

According to a technology according to claim 6 of the present application, in the wireless communication device according to claim 3, the specification of the transmission scheme includes information on transmission power of the acknowledgement response frame.

According to a technology according to claim 7 of the present application, in the wireless communication device according to claim 3, the controller, when classifying the slave station from which an acknowledgement is to be requested into subgroups, notifies the specification of the transmission scheme in a management frame or a beacon frame that contains subgroup identification information notifying that the slave station is a member of the subgroup.

According to a technology according to claim 8 of the present application, in the wireless communication device according to claim 3, the controller notifies the specification of the transmission scheme in a frame requesting an acknowledgement.

A technology according to claim 9 of the present application is a wireless communication device including: a communication unit configured to communicate wirelessly with a master station; and a controller configured to control data transmission with the master station via the communication unit. The communication unit receives a frame transmitted by multicast to a multicast group including the wireless communication device, and the controller, when a predetermined condition is satisfied, allows the communication unit to transmit an acknowledgement response after a lapse of a predetermined time from reception of the frame transmitted by multicast.

According to a technology according to claim 10 of the present application, in the wireless communication device according to claim 9, the communication unit transmits an acknowledgement response frame using a transmission scheme of the acknowledgement response frame specified from the master station.

According to a technology according to claim 11 of the present application, the specification of the transmission scheme includes an encoding scheme of a training signal of the acknowledgement response frame used to form a format capable of separating the frames transmitted simultaneously from the plurality of slave stations using calculation, and in the wireless communication device according to claim 10, the communication unit encodes the training signal in accordance with the encoding scheme, and transmits the encoded training signal.

According to a technology according to claim 12 of the present application, the specification of the transmission scheme includes information on a combination of a modulation method and error correction coding for the acknowledgement response frame, and in the wireless communication device according to claim 10, the communication unit determines the combination of a modulation method and error correction coding to be used for the acknowledgement response frame in accordance with the specification of the transmission scheme.

According to a technology according to claim 13 of the present application, the specification of the transmission scheme includes information on transmission power of the acknowledgement response frame, and in the wireless communication device according to claim 10, the communication unit determines transmission power to be used for the acknowledgement response frame in accordance with the specification of the transmission scheme.

According to a technology according to claim 14 of the present application, in the wireless communication device according to claim 9, the controller allows the communication unit to transmit the acknowledgement response frame when an individual identifier or a connection identifier of the wireless communication device is specified in a multicast data frame received from the master station or a frame requesting an acknowledgement.

According to a technology according to claim 15 of the present application, in the wireless communication device according to claim 9, the controller, when the wireless communication device is specified to be included in a target in subgroup identification information notified previously from the master station in a multicast data frame received from the master station or a frame requesting an acknowledgement, allows the communication unit to transmit the acknowledgement response frame.

According to a technology according to claim 16 of the present application, in the wireless communication device according to claim 9, the controller determines whether to cause the communication unit to transmit the acknowledgement response frame on a basis of a relationship between a sequence number of a received multicast data frame and subgroup identification information notified previously from the master station.

According to a technology according to claim 17 of the present application, in the wireless communication device according to claim 9, the communication unit sets transmission power in such a way that received power in the master station is predetermined power on a basis of a result obtained by estimating an amount of attenuation on a propagation path between the wireless communication device and the master station, and transmits the acknowledgement response.

According to a technology according to claim 18 of the present application, the wireless communication device according to claim 1 operates as an access point supporting IEEE 802.11 standard or a group owner (GO) supporting Wi-Fi direct standard.

According to a technology according to claim 19 of the present application, the wireless communication device according to claim 9 operates as a station supporting IEEE 802.11 standard or a client supporting Wi-Fi direct standard.

Advantageous Effects of Invention

According to the present technology described herein, it is possible to provide an excellent wireless communication device that is capable of improving the reliability by using an acknowledgement response while using radio resources efficiently in multicast transmission over wireless transmission.

According to the present technology described herein, the plurality of wireless communication devices serving as a transmission destination of the multicast data frame transmit simultaneously an acknowledgement response by multicast using spatial multiplexing. The wireless communication device serving as a transmission source decomposes the acknowledgement response received simultaneously and restores it to original individual acknowledgement responses using signal processing based on channel information with each of the wireless communication devices serving as the transmission destination. In other words, the present technology described herein allows the simultaneous transmission of multicast acknowledgement using spatial multiplexing and allows retransmission control using the acknowledgement while utilizing radio resources, thereby achieving the improvement of communication quality.

In addition, the effects described in the present specification are merely illustrative and demonstrative, and not limitative. In other words, the technology according to the present disclosure can exhibit other effects that are evident to those skilled in the art along with or instead of the effects based on the present specification.

The objects, features, and advantages of the present disclosure will be made clear later by a more detailed explanation that is based on the embodiments of the present disclosure and the appended drawings.

BRIEF DESCRIPTION OF DRAWINGS

FIG. 7 is a diagram showing a frame format used for normal packet transmission in the IEEE 802.11 wireless LAN system.

FIG. 8A is a diagram showing components of the PHY preamble when a long preamble is encoded by assigning a code using quadrature encoding.

FIG. 8B is a diagram showing components of the PHY preamble when a long preamble is encoded by assigning a code using time division transmission.

FIG. 9 is a diagram showing an exemplary communication sequence for performing the reception or transmission and the acknowledgement of a multicast data frame between AP and STAs #1 to #6 in the first embodiment.

DESCRIPTION OF EMBODIMENT(S)

Hereinafter, an embodiment of the technology disclosed in the present description will be described in detail with reference to the drawings.

FIG. 1 schematically shows an exemplary configuration of a data transmission system 100 according to the present technology described herein.

Figure 1A:
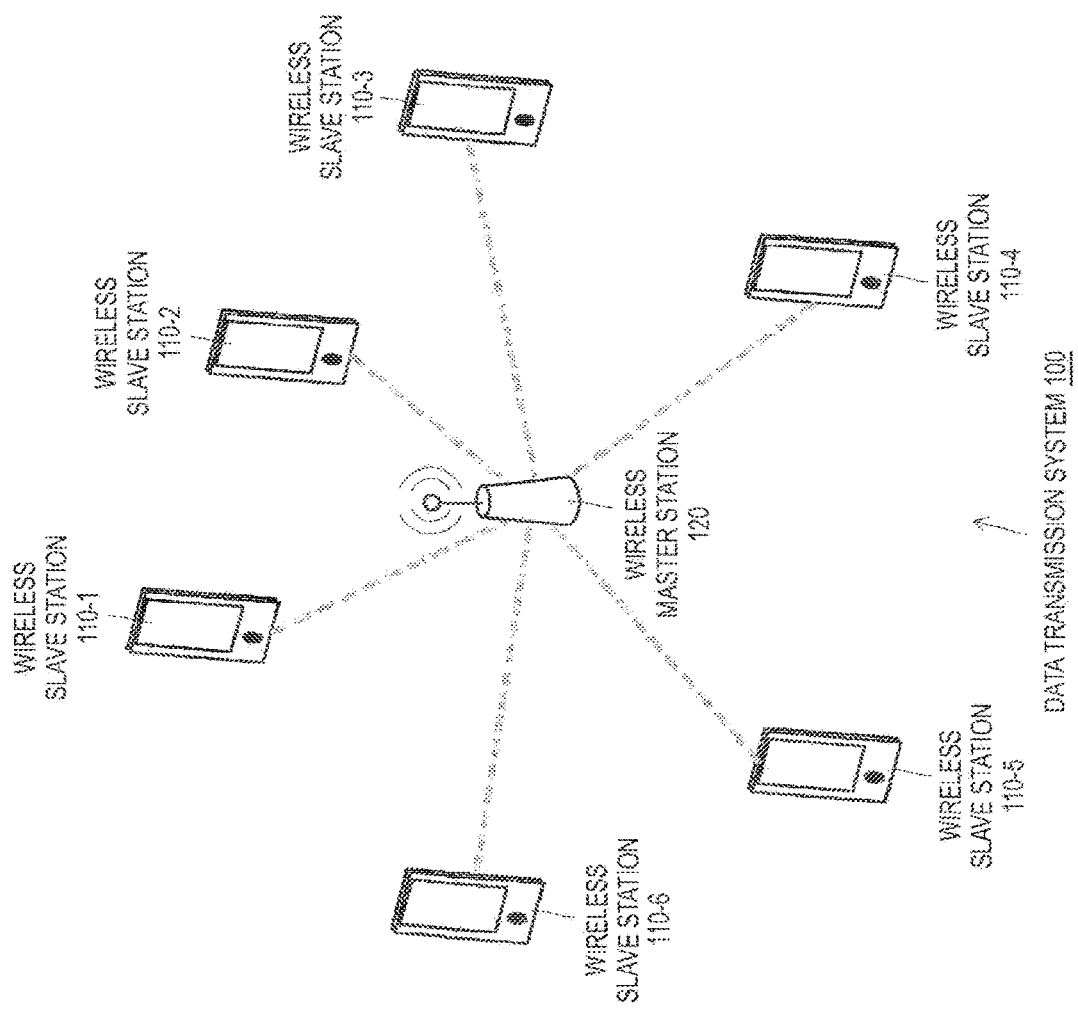
FIG. 1A is a schematic diagram showing an exemplary configuration of a data transmission system 100 according to the present technology described herein.
Figure 1B:
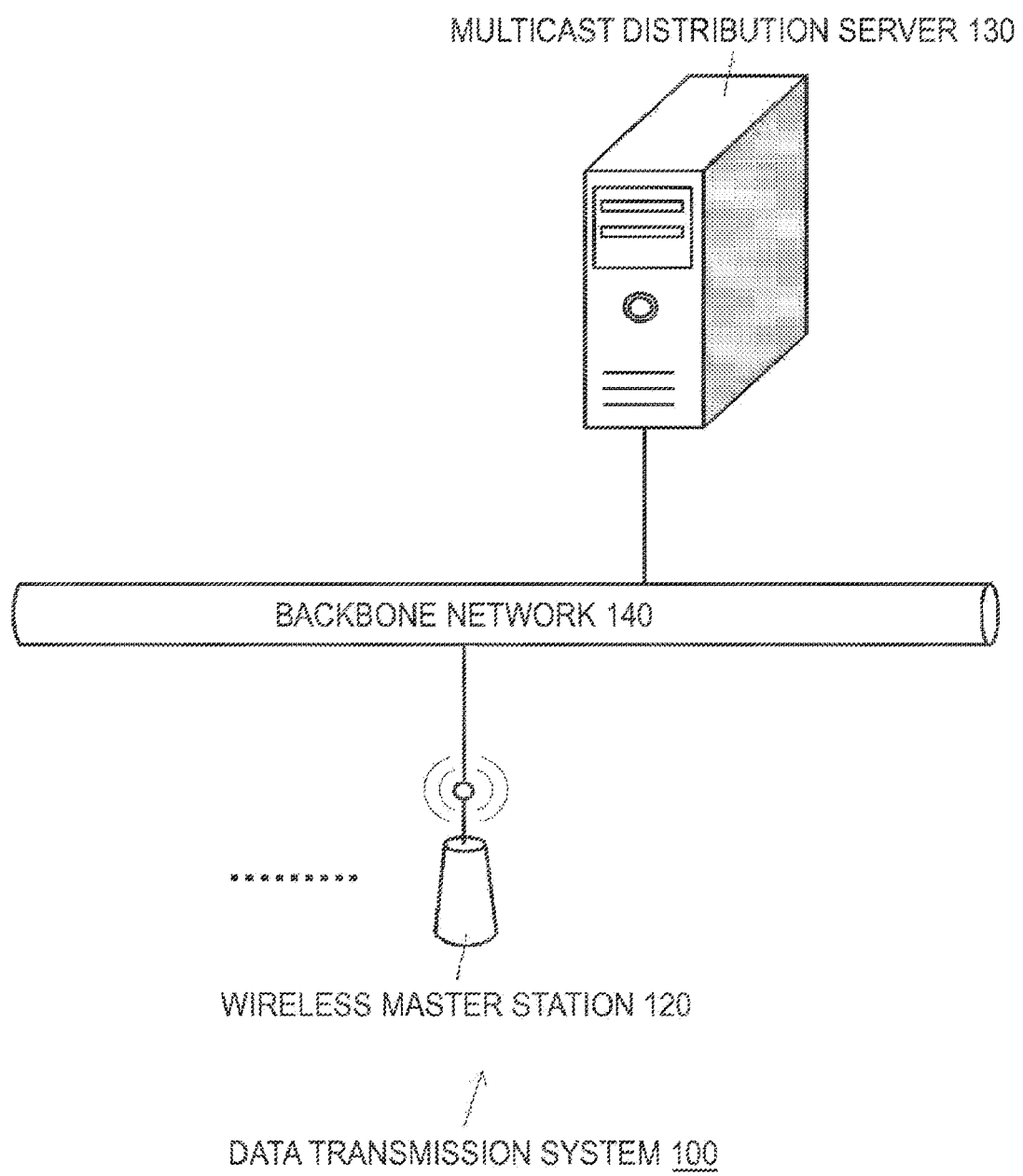
FIG. 1B is a schematic diagram showing an exemplary configuration of the data transmission system 100 according to the present technology described herein.

In the data transmission system 100 illustrated, a multicast distribution server 130 is connected with a wireless master station 120 over a backbone network 140 as shown in FIG. 1B. As shown in FIG. 1A, the wireless master station 120 communicates wirelessly with a plurality of wireless slave stations 110-1, 110-2, . . . , which are under the control of the wireless master station 120. In the data transmission system 100, the multicast data to be transmitted from the multicast distribution server 130 is delivered to the wireless slave stations 110-1, 110-2, . . . all at once via the wireless master station 120 (multicast transmission).

In FIG. 1A, six wireless slave stations 110-1 to 110-6 are illustrated, and the connection is established between each of them and the wireless master station 120. In the following description, it is assumed, for convenience, that any of six wireless slave stations 110-1 to 110-6 participates in a multicast group that receives multicast data from the multicast distribution server 130.

In the present technology described herein, it is not necessary for all the wireless slave stations 110 connected to the wireless master station 120 to participate in the multicast group, but other wireless slave stations that do not participate in the multicast group (not shown) may be connected to the wireless master station 120. The wireless slave stations 110-1 to 110-6 connected to the wireless master station 120 can communicate individually with the wireless master station 120, in addition to the multicast transmission.

In addition to this, the number of the wireless master stations is not limited to one. One or more other wireless master stations that keep other wireless slave stations (not shown) under control may be connected to the multicast distribution server 130. In FIG. 1B, only one wireless master station 120 is illustrated, but a plurality of wireless master stations are also assumed to be connected to the multicast distribution server 130 via the backbone network 140. In this case, the wireless master stations transmits multicast data that is transmitted from the multicast distribution server 130 to the respective wireless slave stations that are under control of their own master station.

The multicast distribution server 130 and the wireless master station 120 are not necessarily separated as shown in FIG. 1B, but the multicast distribution server 130 may be a single device that integrates physically with any one wireless slave station.

Figure 2:
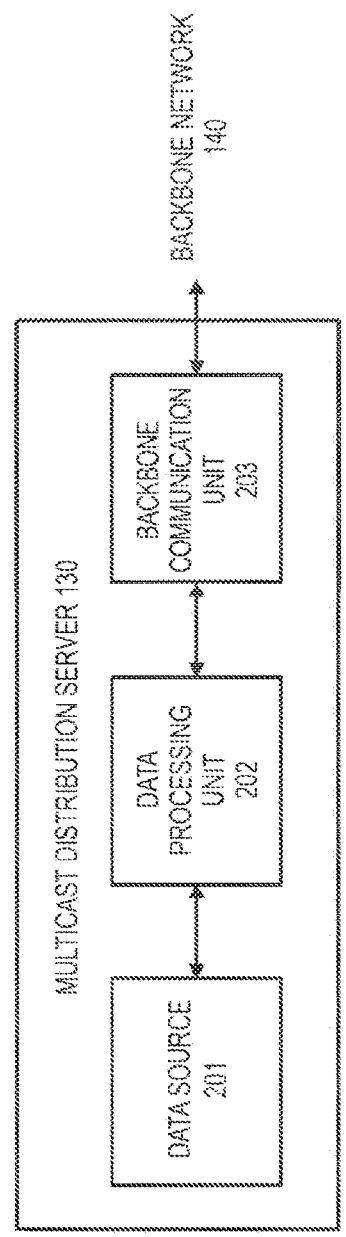
FIG. 2 is a schematic diagram showing a functional configuration of a multicast distribution server 130.

FIG. 2 schematically shows a functional configuration of the multicast distribution server 130. The multicast distribution server 130 illustrated is configured to include a data source 201, a data processing unit 202, and a backbone communication unit 203. The data source 201 generates and encodes content to be distributed and transfers the content to the data processing unit 202. The data processing unit 202 generates a packet from the data inputted from the data source 201. The backbone communication unit 203 attaches a protocol header that is used for communication in the backbone network 140 to the packet and transmits it to the backbone network 140.

Figure 3:
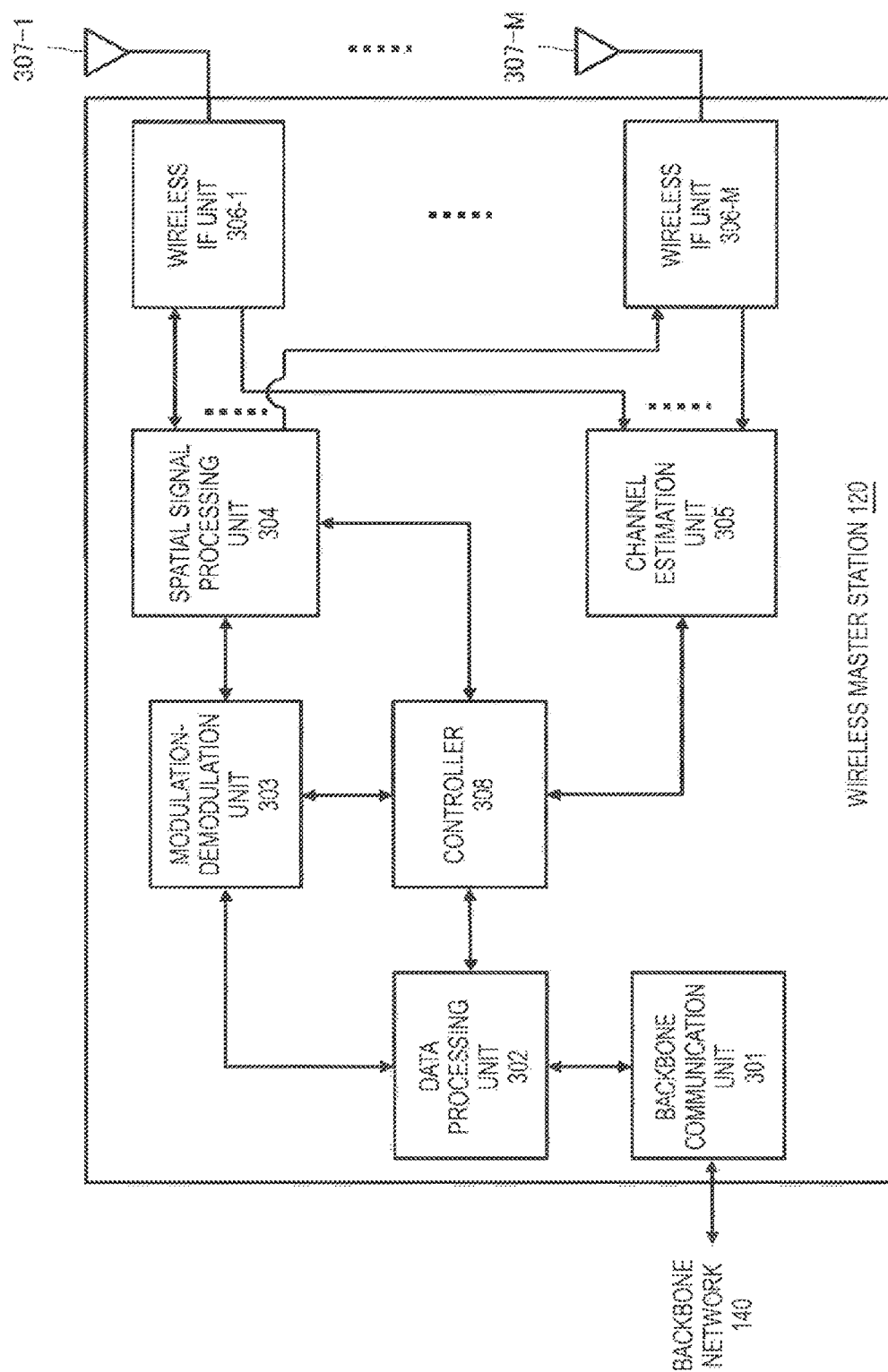
FIG. 3 is a diagram showing an exemplary internal configuration of a wireless master station 120.

FIG. 3 shows an internal configuration of the wireless master station 120. The wireless master station 120 illustrated is configured to include a backbone communication unit 301, a data processing unit 302, a modulation-demodulation unit 303, a spatial signal processing unit 304, a channel estimation unit 305, a wireless interface unit 306, an antenna 307, and a controller 308. In the illustrated example, a plurality of transceiver antennas 307-1 to 307-M and wireless interface (IF) units 306-1 to 306-M for each antenna are assumed to be provided to perform multi-user multiple-input multiple-output (MIMO) communication.

The backbone communication unit 301 communicates with the backbone network 140. The data sent from the multicast distribution server 130 is transmitted to the backbone communication unit 301.

Upon transmission, when the data processing unit 302 receives an input from the backbone communication unit 301 or when the data processing unit 302 generates data, the data processing unit 302 may perform a process of attaching a header used for media access control (MAC) or an error detection code to a packet for wireless communication from the data. Then, the data processing unit 302 provides the modulation-demodulation unit 303 with the processed data. On the other hand, upon reception, when the data processing unit 302 receives an input from the modulation-demodulation unit 303, the data processing unit 302 performs a processing of analyzing the header, detecting any possible error in the packet, and reordering the packets. Then, the data processing unit 302 delivers the processed data to the next higher protocol layer or the backbone communication unit 301.

Upon wireless transmission, the modulation-demodulation unit 303 performs a process of error correction coding, interleaving, and a demodulation process on the data inputted from the data processing unit 302 based on the error correction coding and modulation scheme that are set by the controller 308. Then, the modulation-demodulation unit 303 generates and delivers a data symbol stream to the spatial-signal processing unit 304. Upon wireless reception, the modulation-demodulation unit 303 performs a process of demodulation, interleaving, and error correction coding, in contrast to the time of transmission of the input from the spatial signal processing unit 304, and then delivers the processed data to the data processing unit 302 or the controller 308.

Upon wireless transmission, the spatial signal processing unit 304 performs signal processing to be subjected to spatial separation (described later) on the input if necessary, and provides the resultant one or more transmitted symbol streams for the respective wireless interface units 306-1 to 306-M. Upon wireless reception, the spatial signal processing unit 304 performs spatial processing on the received symbol streams inputted from the respective wireless interface units 306-1 to 306-M, and decomposes the stream if necessary, and then delivers the processed data to the modulation-demodulation unit 303.

The channel estimation unit 305 calculates complex channel gain information of a propagation path from a preamble part or training signal part in the signal inputted from the respective wireless interface units 306-1 to 306-M. The calculated complex channel gain information is used in the demodulation by the modulation-demodulation unit 303 or the spatial processing by the spatial signal processing unit 304 through the controller 308.

Upon wireless transmission, each of the wireless interface units 306-1 to 306-M performs conversion of the digital transmission signal inputted from the spatial signal processing unit 304 to an analog transmission signal, power amplification, filtering, and frequency up-conversion. Then, the respective wireless interface units 306-1 to 306-M send the resultant data to the respective corresponding antennas 307-1 to 307-M. Upon wireless reception, the respective wireless interface units 306-1 to 306-M perform the reverse processing on the input from the respective corresponding antennas 307-1 to 307-M, that is, perform frequency down-conversion, filtering, low-noise amplification, and conversion to digital signal. Then, the respective wireless interface units 306-1 to 306-M provide the result for the spatial signal processing unit 304 or the channel estimation unit 305.

The controller 308 performs a delivery of information, setting of communication parameters, and scheduling of packets in the data processing unit 302 between these components 301 to 306.

Figure 4:
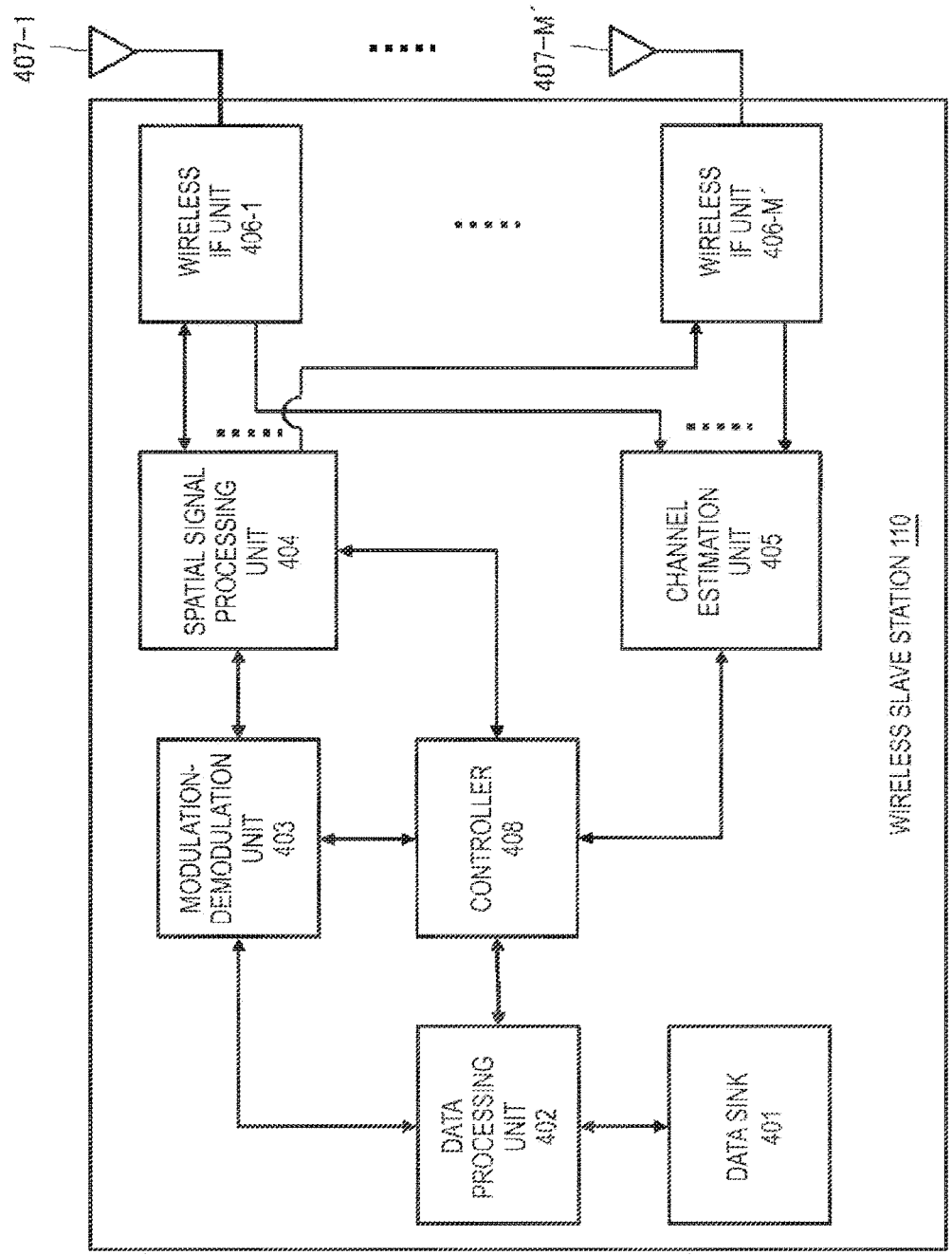
FIG. 4 is a diagram showing an exemplary internal configuration of a wireless slave station 110.

FIG. 4 shows an exemplary internal configuration of the wireless slave station 110. The wireless slave station 110 illustrated is configured to include a data sink 401, a data processing unit 402, a modulation-demodulation unit 403, a spatial signal processing unit 404, a channel estimation unit 405, a wireless interface unit 406, an antenna 407, and a controller 408. In the illustrated example, M transceiver antennas 407-1 to 407-M' and wireless interface units 406-1 to 406-M' for each antenna are provided. The wireless slave station 110 is not necessary to be provided with a plurality of transmission and reception lines, but the wireless slave station 110 may be provided with one line.

The data sink 401 serves as a destination for accepting the received data. The data in the data source 201 of the multicast distribution server 130 is transmitted to the data sink 401 via the backbone network 140 and the wireless master station 120.

Upon transmission, when the data processing unit 402 generates data, the data processing unit 402 may perform a process of attaching a header used for media access control (MAC) or an error detection code to a packet for wireless communication from the data. Then, the data processing unit 402 provides the modulation-demodulation unit 403 with the processed data. On the other hand, upon reception, when the data processing unit 402 receives an input from the modulation-demodulation unit 403, the data processing unit 402 performs a processing of analyzing the header, detecting any possible error in the packet, and reordering the packets. Then, the data processing unit 402 delivers the processed data to the next higher protocol layer or the data sink 401.

Upon wireless transmission, the modulation-demodulation unit 403 performs a process of error correction coding, interleaving, and a demodulation process on the data inputted from the data processing unit 402 based on the error correction coding and modulation scheme that are set by the controller 408. Then, the modulation-demodulation unit 403 generates and delivers a data symbol stream to the spatial-signal processing unit 404. Upon wireless reception, the modulation-demodulation unit 403 performs a process of demodulation, interleaving, and error correction coding, in contrast to the time of transmission of the input from the spatial signal processing unit 404, and then delivers the processed data to the data processing unit 402 or the controller 408.

The spatial signal processing unit 404 provides for the wireless interface units 406-1 to 406-M'. Upon wireless reception, the spatial signal processing unit 404 performs spatial processing on the received symbol streams inputted from the respective wireless interface units 406-1 to 406-M', and decomposes the stream if necessary, and then delivers the resultant data to the modulation-demodulation unit 403.

The channel estimation unit 405 calculates complex channel gain information of a propagation path from a preamble part or training signal part in the signal inputted from the respective wireless interface units 406-1 to 406-M'. The calculated complex channel gain information is used in the demodulation by the modulation-demodulation unit 403 or the spatial processing by the spatial signal processing unit 404 through the controller 408.

Upon wireless transmission, each of the wireless interface units 406-1 to 406-M' performs conversion of the digital transmission signal inputted from the spatial signal processing unit 404 to an analog transmission signal, power amplification, filtering, and frequency up-conversion. Then, the respective wireless interface units 406-1 to 406-M' send the resultant data to the respective corresponding antennas 407-1 to 407-M'. Upon wireless reception, the respective wireless interface units 406-1 to 406-M' perform the reverse processing on the input from the respective corresponding antennas 407-1 to 407-M', that is, perform frequency downconversion, filtering, low-noise amplification, and conversion to digital signal. Then, the respective wireless interface units 406-1 to 406-M' provide the result for the spatial signal processing unit 404 or the channel estimation unit 405.

The controller 408 performs a delivery of information, setting of communication parameters, and scheduling of packets in the data processing unit 402 between these components 401 to 406.

The data transmission system 100 according to the present technology described herein allows the simultaneous transmission of multicast acknowledgement using spatial multiplexing and allows retransmission control using the acknowledgement while utilizing radio resources, thereby achieving the improvement of communication quality.

The plurality of wireless slave stations 110-1, . . . included in a multicast group, when receiving a multicast data frame, transmit simultaneously multicast acknowledgement responses using spatial multiplexing in response to an acknowledgement request from the wireless master station 120 served as a transmission source. On the other hand, the wireless master station 120 performs signal processing based on channel information with the respective wireless slave stations 110-1, . . . , to separate the acknowledgement responses simultaneously received into each individual original acknowledgement response and restore it.

The mechanism for performing simultaneously acknowledgement responses in the multicast transmission will be discussed by taking the following five embodiments as an example.

First Embodiment: There is previous subgrouping. Acknowledgement request is a frame other than a data frame.

Second Embodiment: There is no previous subgrouping. Acknowledgement request is a different frame from a data frame.

Third Embodiment: There is no previous subgrouping. Data frame is used for acknowledgement request explicitly specified.

Fourth Embodiment: There is previous subgrouping. Data frame is used for acknowledgement request implicitly specified using existing parameter value.

Fifth Embodiment: Channel gain information is obtained previously from all members. Acknowledgement request is a frame other than a data frame.

In the following description, the IEEE 802.11 wireless local area network (LAN) system is assumed to be applied to wireless communication between the wireless master station 120 and the wireless slave station 110. These embodiments will be described on the assumption that the wireless master station 120 and the wireless slave station 110 are used interchangeably with an access point (AP) and a station (STA), respectively.

First Embodiment

In the first embodiment, an AP divides an STA that participates in a multicast group into subgroups. The AP transmits an acknowledgement request to the group member STA using a different frame from a data frame.

Figure 5:
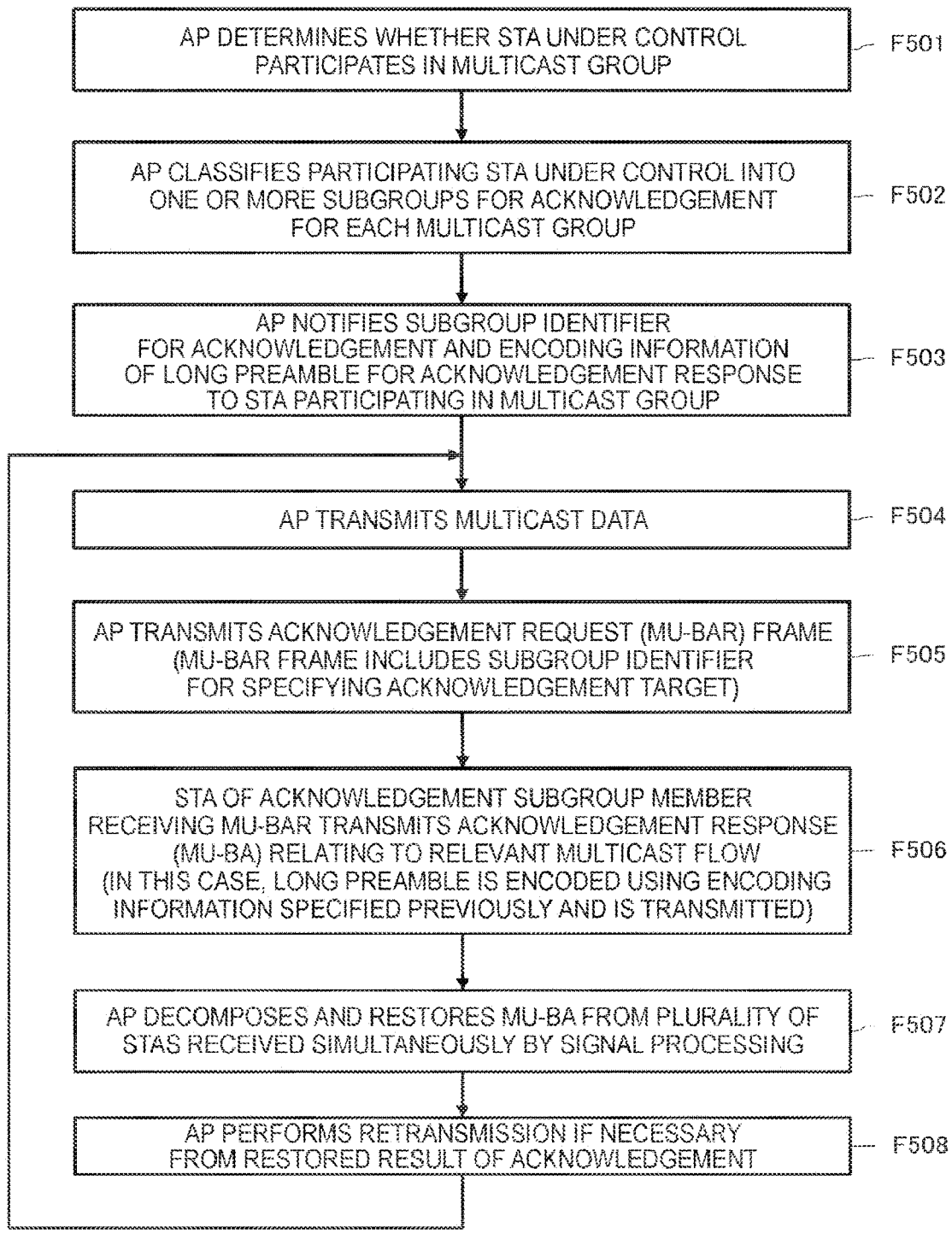
FIG. 5 is a diagram showing the processing flow in a first embodiment.

FIG. 5 shows the processing flow in the first embodiment.

<<Understanding of Multicast Group>>

In flow F501, each STA that belongs to a multicast group is assumed to participate in a multicast group that is intended to be received previously. The participation in the multicast group is performed using a mechanism such as the internet group management protocol (IGMP) or IPv6 multicast listener discovery (MLD). Each STA receives a multicast address of a multicast group in which each participates.

The multicast group participation protocol such as IGMP or IMv6 MLD runs at layer 3 or a higher layer, and thus the AP typically does not know a multicast address to be received by the STA that is under the control of the AP at the time of participating in the multicast group. For this reason, each STA participating in the multicast group causes the AP to know whether each participates in the multicast group, and thus each STA notifies whether each is registered in the multicast to the AP in response to the request from the AP or voluntarily. Alternatively, the AP may have a mechanism for analyzing the contents of layer 3 or higher layer to collect information on the multicast participation of the STA that is under the control of the AP.

<<Creation of Subgroup for Acknowledgement>>

Then, in flow F502, the AP classifies the participating STA that is under the control of the AP into one or more subgroups for acknowledgement for each multicast group. As described later, the AP requests an acknowledgement only for the subgroup, rather than requesting an acknowledgement for multicast transmission from all the STAs in the multicast group whenever the AP performs multicast transmission.

In the state where the AP determines whether each STA that is under the control of the AP participates in the multicast group in flow F501, the AP classifies a target STA to be a receiver (referred to as "group member" hereinafter) into a target of acknowledgement and a non-target of acknowledgement with respect to a multicast group. Not all the members in the group are necessarily to be a target of acknowledgement for the multicast flow. A way of determination is not particularly limited, and any of the following approaches (a1) and (a2) may be used.

(a1) Communication quality obtained from the transmission and reception previously performed for each STA (e.g., the error rate and its use modulation information in downlink and the received signal strength in uplink). As one example, only a group member having poor communication quality (a member having communication quality less than a predetermined value or a predetermined number of group members starting from a member having low communication quality) becomes a target for multicast acknowledgement.

(a2) Information of whether reliability is necessary for the relevant multicast, which is notified from each STA. As one example, only a group member necessitating reliability becomes the target for multicast acknowledgement.

Subsequently, the AP classifies the group members of the acknowledgement target into one or more subgroups. This subgroup becomes a unit of the STA group that simultaneously performs an acknowledgement response of multicast data frames to be transmitted later. Of course, any of the STA groups that simultaneously perform the acknowledgement responses is selected from among multicast group members.

The maximum number of members that can participate in each subgroup is determined previously. In the present embodiment, the maximum number of members in the subgroup is set to 4. In general, the separation of a plurality of signals received simultaneously necessitates the number of receiving antennas larger than or equal to the number of signals. Thus, in the present embodiment, the wireless master station 120 serving as the AP is provided with four or more sets of wireless interface unit 306 and the antenna 307.

The way of classifying the STA into subgroups is not particularly limited. As one example, any of the following approaches (b1) and (b2) may be employed as the classification way.

(b1) Combination allowing signal separation to be easily performed, from wireless channel state information (CSI) between each member and AP obtained from a packet that has been received from each member.

(b2) Combination allowing difference between reception levels in the AP to become small, from CSI information obtained from a packet that has been received from each member.

Figure 6:
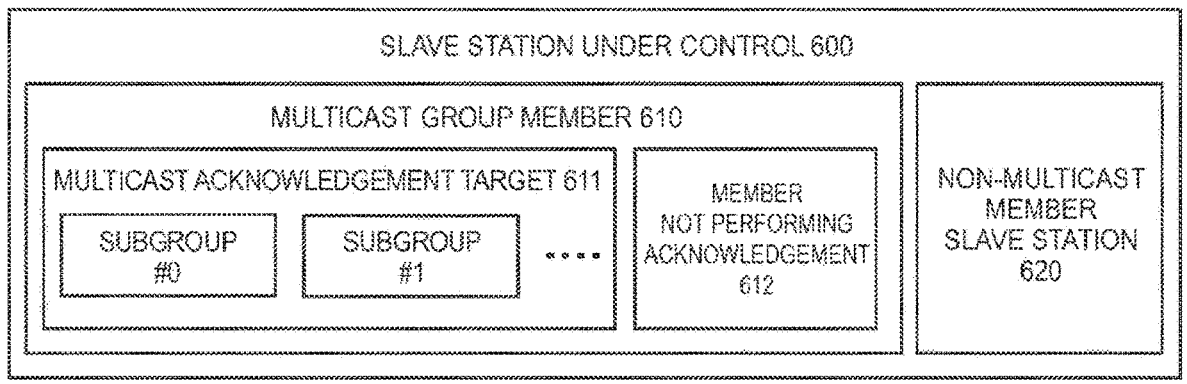
FIG. 6 is a diagram illustrating the inclusion relationship among a station, a member of multicast group, an acknowledgement target, and a subgroup that are connected to the same access point.

FIG. 6 illustrates, as a reference, the inclusion relationship among a STA 600, a multicast group member 610, a multicast transmission acknowledgement target 611, and a subgroup, which are connected to the same AP. The STA can belong to a plurality of multicast groups. Thus, when there are multiple multicast groups, they are likely to be overlapped.

In the example shown in FIG. 6, the STA (slave station under control) 600 connected to the same AP is classified into a multicast group member 610 and a non-multicast group member STA 620. The STA as the multicast group member 610 is classified into a multicast acknowledgement target 611 and a group member 612 that does not acknowledge the reception, based on the state in which whether to participate in the multicast group is determined. Then, the plurality of STAs as the multicast acknowledgement target 611 are classified into a predetermined number of subgroups #0, #1, . . . , based on the criteria such as wireless channel state information or reception level.

In the data transmission system 100 (see FIG. 1A) referred to in the present embodiment, it is assumed that there are six stations (wireless slave stations) and they are all belonging to the same multicast group.

The following description is based on the assumption that six STAs #1 to #6 are all served as the acknowledgement target and six STAs are classified into two subgroups #0 and #1, each composed of three STAs as described below. Identification information used to specify a subgroup is referred to as a subgroup identifier.

Subgroup #0: STA #1, STA #3, STA #5
Subgroup #1: STA #2, STA #4, STA #6

<<Generation of Subgroup Attachment Information>>

The acknowledgement target members are classified into subgroups and then the AP generates attachment information used for the signal separation in the subgroup.

The attachment information is generated to obtain the CSI information from the acknowledgement frame itself. This is because the CSI information from all the STAs in the subgroup is necessary to restore the individual acknowledgements from the acknowledgement response frame to be transmitted simultaneously from the STA group of subgroups.

The acquisition of the CSI information is described. FIG. 7 shows a frame format used for normal packet transmission in the IEEE 802.11 wireless LAN system. A packet 700 includes a PHY preamble 710, a PHY header 720, an MAC header 730, and a payload 740.

The PHY preamble 710 includes a fixed data series 711 (referred to as "short preamble" hereinafter) used to perform packet detection and frequency synchronization in the physical layer on the receiving side and a fixed data series 712 (referred to as "long preamble" hereinafter) used to obtain the CSI on the receiving side. The latter data series is set to "L". A wireless device, when receiving a packet, knows L and accordingly, can know the CSI by using a reception waveform of that portion. The known information used to obtain the CSI, such as the long preamble, is also referred to as "training signal".

However, when the subgroup member STAs simultaneously transmit the acknowledgements using the format as it is, the signal of the long preamble 712 for the CSI estimation will be subject to interference, thus it is not possible for the AP to obtain the individual CSI information. To address this problem, it is considered that different encoding for each member in the subgroup is performed on the signal of the long preamble 712.

In the present embodiment, the long preamble portion is extended, is encoded using a format that can receive simultaneously transmitted signals, and is used for the acknowledgement frame. Examples of a way of encoding include any of the following schemes (c1) and (c2).

(c1) Quadrature Encoding

In the quadrature encoding scheme, the Walsh series having the length larger than or equal to the maximum number of subgroup members is generated. In the present embodiment, the maximum number is set to 4, and thus the Walsh series having the series length of 4 is generated. In this case, four series of codes 1 to 4 shown below are available.

[1, 1, 1, 1] (code 1)
[1, 1, −1, −1] (code 2)
[1, −1, 1, −1] (code 3)
[1, −1, −1, 1] (code 4)

It is possible to generate four series having four times the length of L, obtained by multiplying the series L to each component using the Walsh series as shown below.

[L, L, L, L]
[L, L, −L, −L]
[L, −L, L, −L]
[L, −L, −L, L]

These four series are orthogonal to each other. Thus, even when they are received simultaneously, it is possible to obtain the individual CSI by multiplying a code corresponding to the code to be extracted out of the codes 1 to 4 and adding it to each length of L.

In this scheme, any of the codes 1 to 4 is assigned to the group member STA for each subgroup in such a way that the codes are not overlapped.

(c2) Time Division Transmission

In this approach of time division transmission, literally, transmission is performed by shifting transmission time so that the transmission of L from each subgroup member is not overlapped. This is equivalent to replacing the codes in the quadrature encoding by codes 11 to 13 shown below.

[1, 0, 0] (code 11)
[0, 1, 0] (code 12)
[0, 0, 1] (code 13)

In the data transmission system 100 (see FIG. 1A) referred to in the present embodiment, six group member STAs #1 to #6 are classified two subgroups #0 and #1, each composed of three STAs (as described below), but the code assignment is assumed to be performed using any of quadrature encoding and time division transmission schemes as shown in the following subgroups (d1) and (d2) in each subgroup.

(d1) Subgroup #0
STA #1 code 1 or 11
STA #3 code 2 or 12
STA #5 code 3 or 13
(d2) Subgroup #1
STA #2 code 1 or 11
STA #4 code 2 or 12
STA #6 code 3 or 13

FIG. 8A shows the contents of PHY preamble in a case where the encoding of the long preamble is performed by assigning the codes 1 to 3 to the group member STA in each of the subgroups #0 and #1 using the quadrature encoding in such a way as not to be overlapped. FIG. 8B shows the contents of PHY preamble in a case where the encoding of the long preamble is performed by assigning the codes 11 to 13 to the group member STA in each of the subgroups #0 and #1 using the time division transmission in such a way as not to be overlapped.

<<Previous Notification of Acknowledgement Subgroup and Attachment Information>>

Then, in flow F503, the AP previously notifies the subgroup information of each member determined previously and the encoded information of the long preamble signal used by each member in the subgroup to each group member. A management frame to be transmitted by the AP for the notification is referred to as "Ack group assignment frame" hereinafter. The AP may transmit the Ack group assignment frame individually to each member by unicast, or may transmit it to the destination of the multicast address to which all of the group members receive it. The AP may transmit the attachment information as a portion of an existing broadcast frame such as beacon without the use of a dedicated Ack group assignment frame.

The information previously notified by the AP to each member includes the contents (e1) and (e2) below.

(e1) Information used to associate each group member with its subgroup identifier
(e2) Attachment information to a subgroup member in each subgroup (long preamble encoding scheme, maximum code length, and identifier of assignment code)

When the maximum code length (as described above, this value is dependent on the maximum number of subgroups) and the long preamble encoding scheme of the attachment information of item (e2) are predetermined and shared, they are not necessarily included in the Ack group assignment frame.

The modulation scheme and error correction coding used for an acknowledgement response by a subgroup member or the information on transmission power used for an acknowledgement response (rather than MU-BAR described later) may be included in the attachment information of the Ack group assignment frame.

The group member, when previously receiving the subgroup information and the attachment information (e1) and (e2), stores them in a memory of the controller 408 for an example, and uses the acknowledgement response frame (training signal) at the time of transmission.

The AP may add or change the subgroup assignment and attachment information during the distribution of the multicast flow. In this case, the notification as described above is newly made to all the members again.

The processes F501 to F503 described above are those relating to previous setup and may be performed at least once.

The subsequent processes F504 to F508 are performed repeatedly with the transmission and reception of the multicast data. FIG. 9 shows an exemplary communication sequence for performing the reception or transmission and the acknowledgement of a multicast data frame between AP and STAs #1 to #6 in the present embodiment.

<<Transmission and Reception of Multicast Data>>

In flow F504, the AP transmits sequentially multicast data DATA #0, DATA #1, and DATA #2 to the multicast group STAs #1 to #6, as indicated by reference numbers 901 to 903 in FIG. 9. The frame of these multicast data is transmitted using a normal frame format as shown in FIG. 7 without performing the encoding described above.

When the multicast group member STAs #1 to #6 are previously assigned to the subgroup that is an acknowledgement target in the Ack group assignment frame or beacon frame, the multicast group member STAs #1 to #6 may hold the reception state of individual multicast frame for each sequence number of the multicast data frame.

At the same time, the group member STAs #1 to #6 of the subgroup correct the frequency offset of a reference oscillator for the AP using the PHY preamble of the multicast data frame.

<<Acknowledgement>>

In the present embodiment, the AP transmits one or more multicast data frames, and then, in flow F505, the AP transmits the acknowledgement request frame (referred to as "multi-user block Ack request (MU-BAR) frame" hereinafter) to a plurality of users as indicated by reference numbers 904 and 908 in FIG. 9.

In the present embodiment (example shown in FIG. 9), the description will be based on the assumption that the AP transmits only MU-BAR as a single wireless packet. In a modified example, the AP may transmit MU-BAR as a single wireless packet in a wireless section by performing the aggregation at the MAC layer using the multicast data and aggregated MAC protocol data unit (A-MPDU).

The MU-BAR frame includes the following contents (f1) to (f5).

(f1) Information to specify multicast flow of acknowledgement target
(f2) Subgroup identifier as a target to which multicast acknowledgement response is expected
(f3) Starting sequence number as a target of multicast acknowledgement response from subgroup member
(f4) Modulation scheme and error correction code used for acknowledgement response
(f5) Information relating to transmission power used for acknowledgement response Even when the information relating to modulation scheme used for acknowledgement response (f4) is not necessarily specified explicitly, a rule determined uniquely for all the acknowledgement targets may be shared between the AP and each STA, such as when the lowest rate is typically used or the same rate as the MU-BAR frame is used. In this case, the information relating to modulation scheme may be configured not to be included in the frame. The modulation scheme to be used for the acknowledgement response may be limited to the modulation that does not use two or more spatial streams.

The information relating to transmission power used for acknowledgement response (f5) is reported to prevent a significant reception power difference between acknowledgement responses received by the AP simultaneously from a plurality of STAs from occurring. This is because that when the reception power difference is excessively large, it may be no longer possible to restore the response frame having lower power. Thus, a notification of desired transmission power is given to each member STA so that the reception power of the response from the respective subgroup member STAs in the AT matches a target power. In the contents of the information (f5), the value of transmission power to be used for the response transmission is directly specified, or a difference value between the desired power and the previous transmission power is specified to report a fact that the previous response transmission is to be increased or to be decreased to be close to the desired power. This difference value may be calculated by referring to the reception power upon the transmission or reception of the previous frame with the subgroup member. The information relating to a request for the transmission power (f5) may be configured necessarily not to be included in the frame. In this case, the transmission power is determined and adjusted in an autonomous way for each STA.

The MU-BAR frame is transmitted to a multicast address to be an acknowledgement target. This address may be set as a destination by using implicitly the information for specifying multicast flow of acknowledgement target (f1) described above.

In flow F506, each STA of the subgroup members #0 and #1, when receiving the MU-BAR frames 904 and 908 from the AP, transmits an acknowledgement response MU-BA frame relating to the relevant multicast flow as indicated by reference numbers 905 to 907 and 909 to 911 in FIG. 9. In this case, the long preamble is encoded using encoding information previously specified by the AP (described above) and is transmitted.

Figure 10:
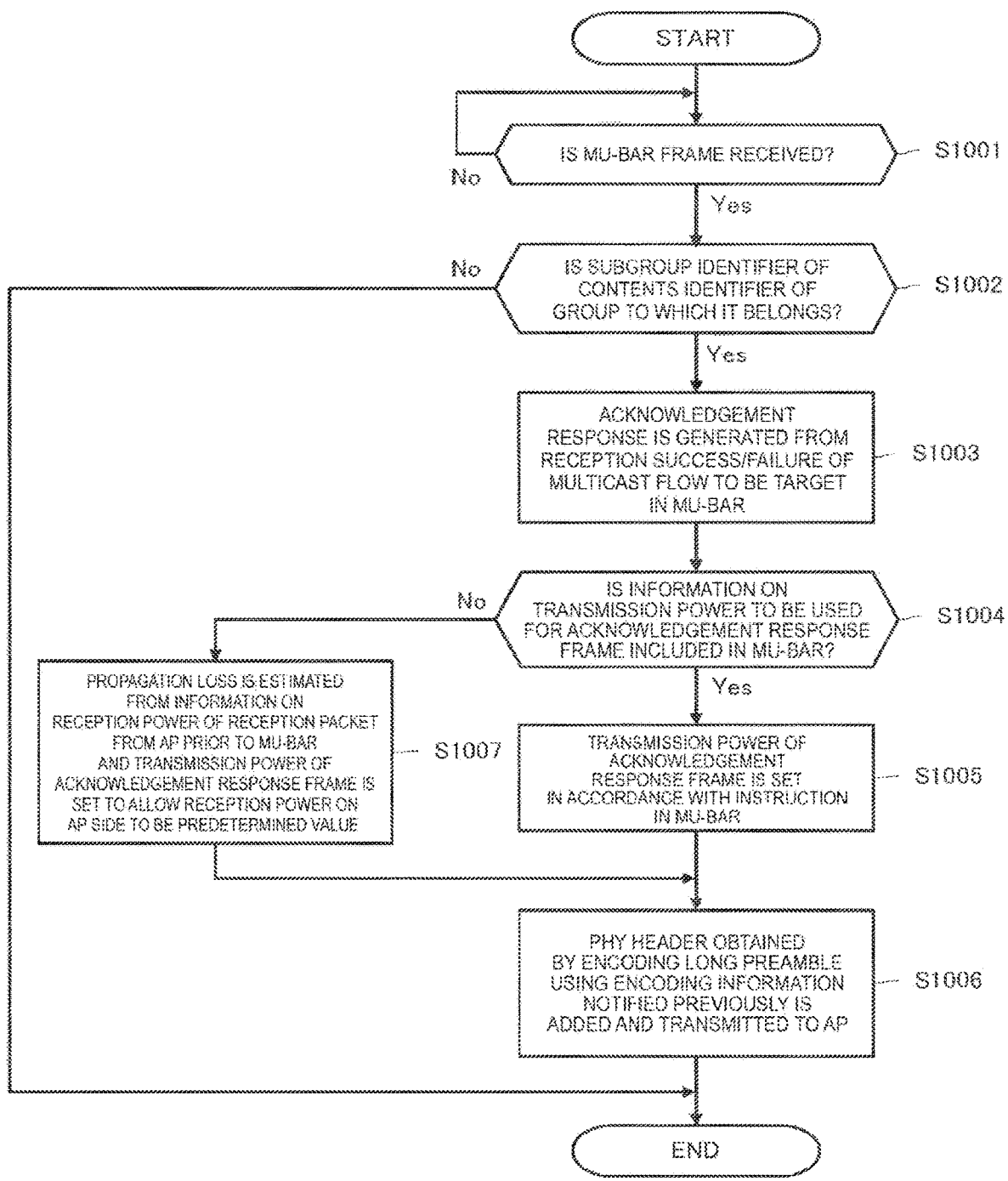
FIG. 10 is a flowchart showing the processing procedure performed in response to the fact that the STA receives an MU-BAR frame from the AP in the first embodiment.

FIG. 10 shows showing the processing procedure performed in response to the fact that the STA receives an MU-BAR frame from the AP in the first embodiment in flowchart form.

The STA, when receiving an MU-BAR frame from the AP (Yes in step S1001), checks whether a subgroup identifier included in the MU-BAR frame is an identifier of a group to which the STA belongs (step S1002).

If the subgroup identifier is not an identifier of a group to which the STA belongs (No in step S1002), the STA skips all the subsequent processes and terminates the process.

On the other hand, if the subgroup identifier is an identifier of a group to which the STA belongs (Yes in step S1002), the STA generates an acknowledgement response MU-BA from a reception success/failure record of the multicast flow to be a target by the MU-BAR frame (step S1003).

Each subgroup member STA includes reception success/failure information for each sequence number in the target multicast flow in the MU-BA frame to be generated. Although the multicast flow transmitted from the AP before the MU-BAR frame is received is the target, it is not necessary to include information having a number preceding the starting sequence number notified in the MU-BAR frame. In the STA, even when there is a retransmission request and the request is arrived, the frame, which can be determined that there is no value in use at the higher layer of the STA, though it is not received, may be notified as a success in the determination by the STA.

Then, the STA checks whether information on transmission power to be used in the acknowledgement response frame is included in the MU-BAR frame (step S1004).

If the information on transmission power to be used in the acknowledgement response frame is included in the MU-BAR frame (Yes in step S1004), the STA sets the transmission power to be used in the acknowledgement response frame in accordance with an instruction in the MU-BAR frame (step S1005).

If the information on transmission power to be used in the acknowledgement response frame is not included in the MU-BAR frame (No in step S1004), the STA estimates the propagation loss from the information on the previous transmission power (the packet previously received from the AP including MU-BAR) and sets the transmission power of the acknowledgement response frame so that the reception power on the AP side becomes a predetermined value (step S1007). The predetermined value is assumed to be shared previously at least among the subgroup member STAs.

The power to be used for transmission of the MU-BA in step S1005 or S1007 may be controlled if necessary.

Then, the STA adds a PHY preamble obtained by encoding the long preamble using the encoding information notified previously in the Ack group assignment frame or the beacon frame and transmits a resultant multi-user block Ack (MU-BA) frame (step S1006).

In summary, according to the processing procedure shown in FIG. 10, the STA, when receiving the MU-BAR, checks whether a subgroup identifier described in the contents matches an identifier of a subgroup to which the STA belongs. The STA transmits the MU-BA frame only when they match.

The MU-BA is transmitted from the STA at a time when a predetermined time has elapsed from immediately after the STA terminates the reception of the MU-BAR. The interval of the predetermined time is shared between the AP and all the STAs, and it is desirable that the interval prevents the wireless transmission of the third party who is in the communicable range from being interrupted. When the MU-BAR frame including the information for specifying the predetermined time interval is transmitted in a subgroup unit or a different MU-BAR is transmitted in the same subgroup, different values may be used. In the present embodiment, the short inter-frame space (SIFS) defined in the IEEE 802.11 wireless LAN standard is used. It may be possible to use PCF Inter-frame Space (PIFS) instead of SIFS. During this transmission, it may be possible for each STA not to perform the carrier sensing.

On the AP side, the MU-BA is received simultaneously from the specified subgroup member after the SIFS duration of the MU-BAR transmission. Then, the AP decomposes and restores the MU-BAs simultaneously received from the plurality of STAs using signal processing in flow F507.

Figure 11:
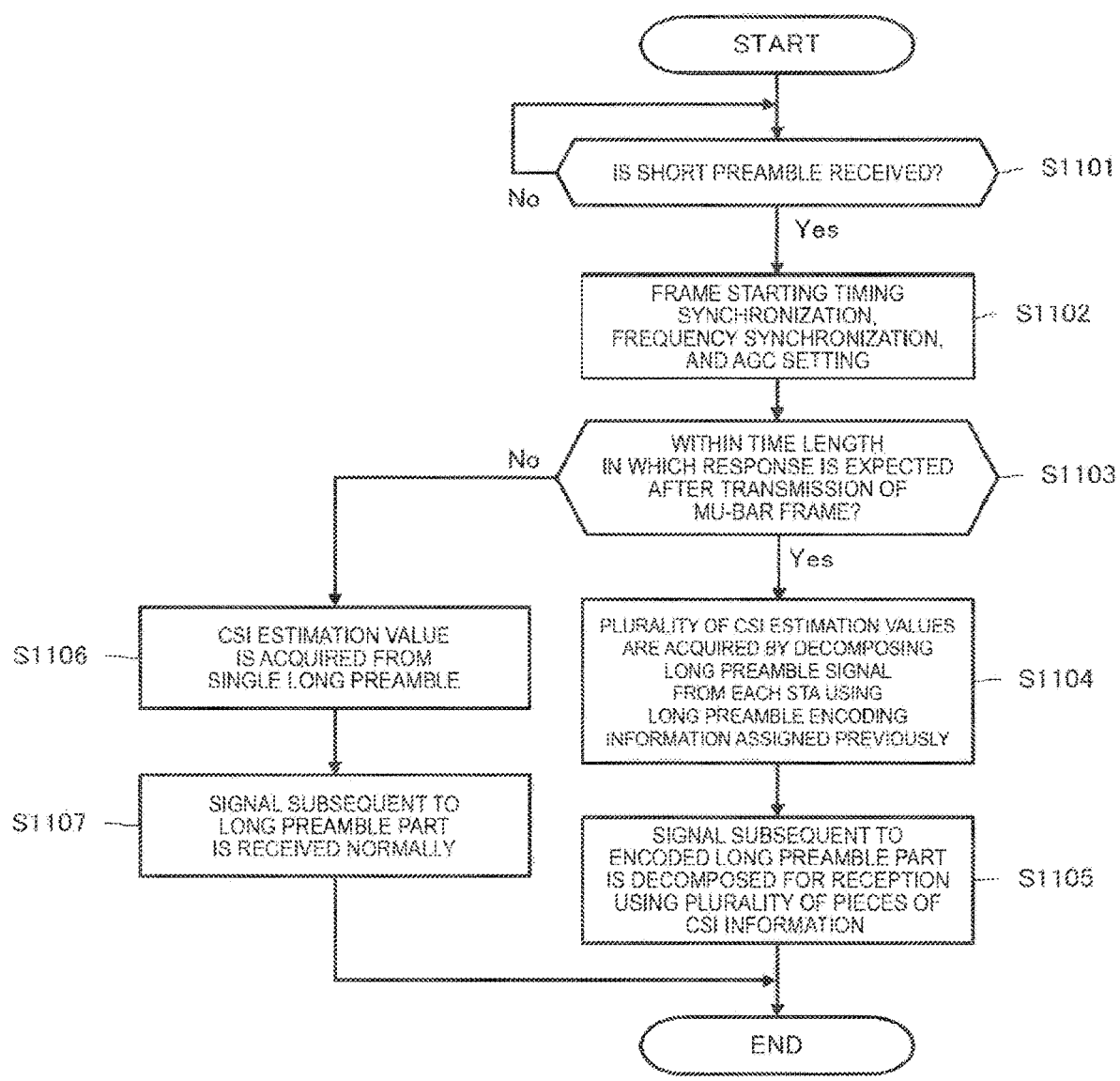
FIG. 11 is a flowchart showing the procedure of a process for receiving an MU-BA from a subgroup member specified by the AP.

FIG. 11 shows the procedure of a process for receiving an MU-BA from a subgroup member specified by the AP in flowchart form. The AP, after transmitting the MU-BAR, waits for the MU-BA frame from the subgroup and performs a process different from a normal reception process.

When the AP detects a short preamble (Yes in step S1101), the reception signal processed in the respective wireless interface units 306-1, . . . is sent to the channel estimation unit 305, and the synchronization of frame staring timing, frequency synchronization, and setting of auto gain control are performed in the short preamble portion (step S1102).

Then, the AP checks whether it is possible to receive simultaneously the MU-BAs from the group member STAs within a time length (SIFS) at which the response from the completion of the MU-BAR transmission is expected (step S1103).

If it is possible to receive simultaneously the MU-BAs from the group member STAs within a time length at which the response from the completion of the MU-BAR transmission is expected (Yes in step S1103), the channel estimation unit 305 restores long preamble reception series for each subgroup member from each of the codes assigned previously to each of the group member SATs in the encoded long preamble part subsequent to the short preamble part, and acquires a CSI estimation value from each STA (step S1104).

When the long preamble is encoded by assigning the code using quadrature encoding, the channel estimation unit 305 performs an operation of multiplying a code corresponding to the code intended to be extracted among orthogonal codes by one element of the code with respect to the length unit of the series L and adding the multiplication result in a unit of length L, thereby restoring the long preamble reception series of each of the subgroup members. When the long preamble is encoded by assigning the code using time division transmission, the channel estimation unit 305 performs a time shift and extracts the long preamble reception series of each of the subgroup members.

The long preamble reception series obtained as described above becomes CSI from each STA, which is received through each of the antennas 307-1 to 307-M (reception chain). In this regard, when a receiving antenna number is m (m=1 to M, where M is total number of antennas used for reception by the AP) and a used code number (becomes information for specifying the STA together with the subgroup identifier) is n (n=1 to N, where N is the number of the subgroup members that is the total number of codes to be used and corresponds to a multiple number of MU-BAs), a estimation channel matrix H having the number of elements of M×N by combining the receiving antenna and the used code is obtained. When the estimated CSI of each member STA is represented by $h_{m,n}$, the estimation channel matrix H is expressed by the following Formula (1).

[Math. 1]

$$H = \begin{bmatrix} h_{1,1} & \cdots & h_{1,N} \\ \vdots & \ddots & \vdots \\ h_{M,1} & \cdots & h_{M,n} \end{bmatrix} \quad (1)$$

When the input signal in the antenna number m simultaneously received is represented by $y_m$, a received signal vector Y is expressed by the following Formula (2).

[Math. 2]

$$Y = \begin{bmatrix} y_1 \\ \vdots \\ y_M \end{bmatrix} \quad (2)$$

The estimated channel matrix H and the received signal vector Y are inputted to the spatial signal processing unit 304. Then, the spatial signal processing unit 304 restores (decomposes) the MU-BA from each of the subgroup member STAs using the channel matrix H and the received signal vector Y (step S1105). The decomposition process is applied to the signal subsequent to the long preamble part (i.e., subsequent to the PHY header).

The algorithm of the restoration (decomposition) process of the MU-BA performed by the spatial signal processing unit 304 is not particularly limited. As one example, it is possible to perform the decomposition process of a plurality signals using the minimum mean square error (MMSE) equation. According to the MMSE equation, a process of reducing the interference component from other STAs by multiplying the received signal vector Y by the weighting vector W facilitates the decomposition of signals. The weighting vector W is expressed by the following Formula (3), where the noise vector including a noise vector $n_m$ generated in each antenna is set to N. In the following Formula (3), $H^H$ represents the Hermitian transpose matrix of a channel matrix.

[Math. 3]

$$W = H^H \{HH^H + NI\}^{-1} \quad (3)$$

The process performed as described above allows the AP to restore the MU-BA from all the members of the subgroup to be a target of the MU-BAR, thereby obtaining the acknowledgement information of the multicast data flow.

On the other hand, if it is not possible to receive simultaneously the MU-BAs from the group member STAs within a time length at which the response from the completion of the MU-BAR transmission is expected (No in step S1103), the AP returns the process to the normal reception operation. In this case, the channel estimation unit 305 acquires a CSI estimation value from a single long preamble (step S1106). Then, the spatial signal processing unit 304 performs a reception process of a signal subsequent to the long preamble part (i.e., subsequent to the PHY header) based on the acquired CSI information (step S1107).

If it is not possible for the AP to restore a dominant frame for a particular code from a result obtained by performing the restoration process on the MU-BA in step S1105, it is considered that the STA to which the code is assigned is likely not to receive correctly the MU-BAR and is likely not to transmit the MU-BA. The process to be performed in that case is not illustrated in FIG. 11, but the AP may retransmit the MU-BAR.

<<Retransmission of Multicast Data>>

The AP, when acquiring the acknowledgement information by separating the acknowledgement response from the subgroup member, retransmits the multicast data in flow F508 depending on the result, if necessary.

The retransmission of the multicast data by the AP may be performed at a time immediately after the acknowledgement response is checked.

When burst-like interference such as a microwave oven is detected, even though the retransmission is previously performed, it is likely to be failed again. In such a case, the AP may add a predetermined delay and then retransmit the multicast data. In the relevant multicast flow (contents), when the request of delay is defined, the AP is assumed to add a delay within a range that does not exceed the defined value.

Second Embodiment

In the second embodiment, the AP does not previously divide an STA that participates in a multicast group into subgroups. The AP transmits the acknowledgement request to the group member STA in a different frame from the data frame.

Figure 12:
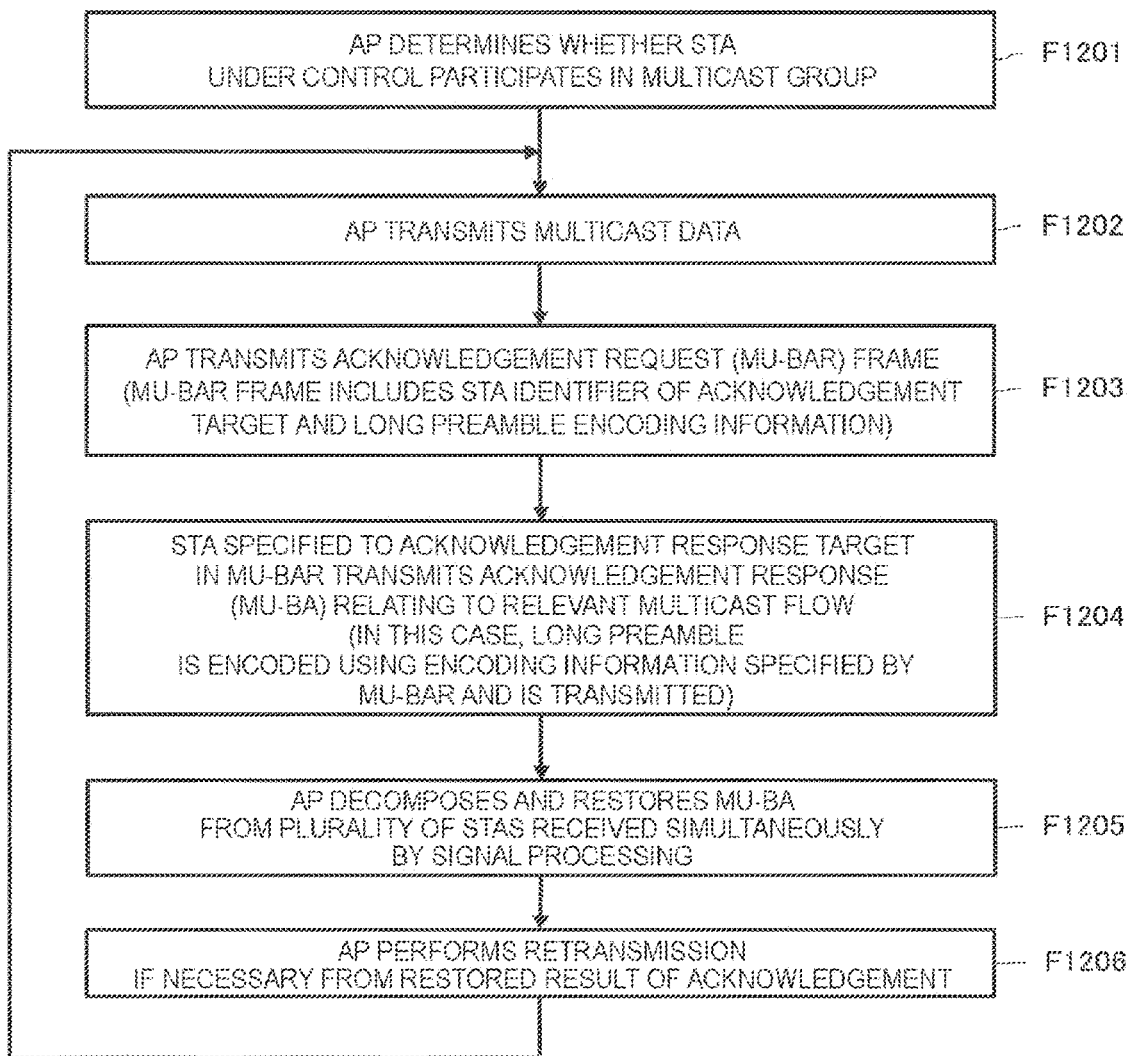
FIG. 12 is a diagram showing the processing flow in a second embodiment.

FIG. 12 shows the processing flow in the second embodiment.

<<Understanding of Multicast Group>>

In flow F1201, each STA that belongs to a multicast group is assumed to participate in a multicast group that is intended to be received previously. The participation in the multicast group is performed using a mechanism such as the IGMP or IPv6 MLD. Each STA receives a multicast address of a multicast group in which each participates.

Each STA participating in the multicast group causes the AP to know whether each participates in the multicast group, and thus each STA notifies whether each is registered in the multicast to the AP in response to the request from the AP or voluntarily. Alternatively, the AP may have a mechanism for analyzing the contents of layer 3 or higher layer to collect information on the multicast participation of the STA that is under the control of the AP.

In the second embodiment, the AP does not create the acknowledgement subgroup. The previous notification of the acknowledgement subgroup and the attachment information is not performed.

The subsequent processes are performed repeatedly with the transmission or reception of the multicast data. Even in the present embodiment, the reception or transmission and the acknowledgement of a multicast data frame between AP and multicast group STAs #1 to #6 are performed in accordance with the communication sequence shown in FIG. 9, which is similar to the first embodiment.

<<Transmission and Reception of Multicast Data>>

In flow F1202, the AP transmits sequentially multicast data DATA #0, DATA #1, and DATA #2 to the multicast group STAs #1 to #6, as indicated by reference numbers 901 to 903 in FIG. 9. The frame of these multicast data is transmitted using a normal frame format as shown in FIG. 7 without performing the encoding described above.

The multicast group member STAs #1 to #6 may hold the reception state of individual multicast frame for each sequence number of the multicast data frame. The multicast group member STAs #1 to #6 correct the frequency offset of a reference oscillator for the AP using the PHY preamble of the multicast data frame.

<<Acknowledgement>>

In the present embodiment, the AP transmits one or more multicast data frames and then transmits the MU-BAR frame that requests the acknowledgement as indicated by reference numbers 904 and 908 in FIG. 9 in flow F1203. In the present embodiment, the AP writes the STA identifier that requests the MU-BA and the encoding information of long preamble in the MU-BAR frame along with the contents (f1), (f4), and (f5) described above.

It is possible to use an individual identifier such as a MAC address of the STA or a connection identifier such as an association ID (AID) in the AP, as an identifier for the STA. Examples of the attachment information of the long preamble include long preamble encoding scheme, maximum code length, and identifier of assignment code.

The AP may transmit MU-BAR as a single wireless packet in a wireless section by performing the aggregation at the MAC layer using the multicast data and the A-MPDU in addition to transmission of only MU-BAR as a single wireless packet as shown in FIG. 9 (this is similar to the above).

Each of the STAs in which the MU-BA is specified to be requested using the individual identifier or the connection identifier in the MU-BAR frame, when receiving the MU-BAR frames 904 and 908 from the AP, transmits the acknowledgement response MU-BA frame relating to the relevant multicast flow as indicated by reference numbers 905 to 907 and 909 to 911 in FIG. 9 in flow F1204. In this case, the long preamble is encoded (as described above) using the encoding information specified by the MU-BAR frame and then is transmitted.

Figure 13:
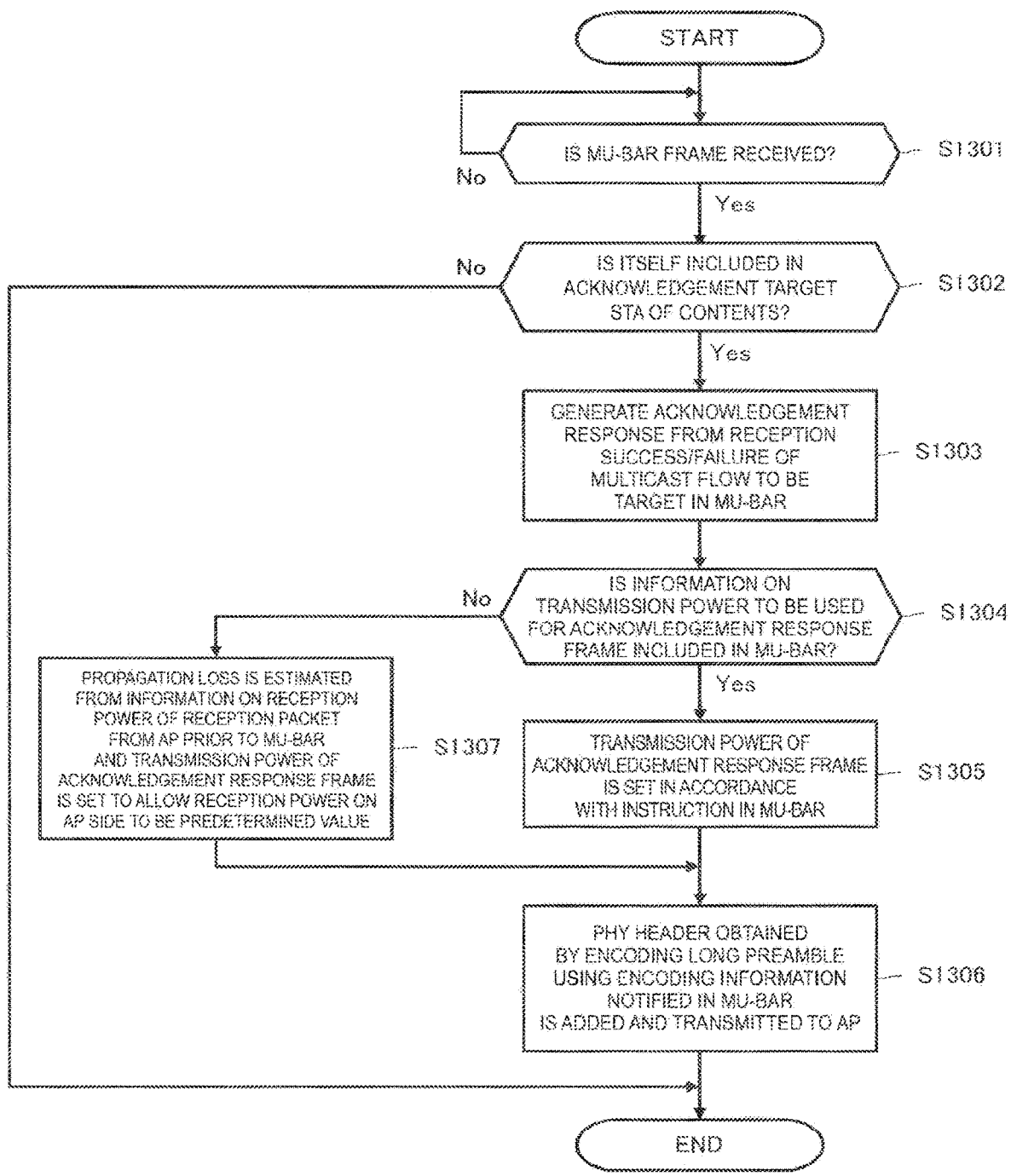
FIG. 13 is a flowchart showing the processing procedure performed in response to the fact that the STA receives an MU-BAR frame from the AP in the second embodiment.

FIG. 13 shows showing the processing procedure performed in response to the fact that the STA receives an MU-BAR frame from the AP in the first embodiment in flowchart form.

The STA, when receiving the MU-BAR frame from the AP (Yes in step S1301), checks whether its own individual identifier or connection identifier is specified in the MU-BAR frame (step S1302).

If its own individual identifier or connection identifier is not specified (No in step S1302), the STA skips all the subsequent processes and terminates this process.

On the other hand, if its own individual identifier or connection identifier is specified (Yes in step S1302), the STA generates an acknowledgement response MU-BA from a reception success/failure record of the multicast flow to be a target by the MU-BAR frame (step S1303).

The STA includes reception success/failure information for each sequence number in the target multicast flow in the MU-BA frame to be generated. Although the multicast flow transmitted from the AP before the MU-BAR frame is received is the target, it is not necessary to include information having a number preceding the starting sequence number notified in the MU-BAR frame. In the STA, even when there is a retransmission request and the request is arrived, the frame, which can be determined that there is no value in use at the higher layer of the STA, though it is not received, may be notified as a success in the determination by the STA.

Then, the STA checks whether information on transmission power to be used in the acknowledgement response frame is included in the MU-BAR frame (step S1304).

If the information on transmission power to be used in the acknowledgement response frame is included in the MU-BAR frame (Yes in step S1304), the STA sets the transmission power to be used in the acknowledgement response frame in accordance with an instruction in the MU-BAR frame (step S1305).

If the information on transmission power to be used in the acknowledgement response frame is not included in the MU-BAR frame (No in step S1304), the STA estimates the propagation loss from the information on the previous transmission power (the packet previously received from the AP including MU-BAR) and sets the transmission power of the acknowledgement response frame so that the reception power on the AP side becomes a predetermined value (step S1307). The predetermined value is assumed to be shared previously at least among the subgroup member STAs.

The power to be used for transmission of the MU-BA in step S1305 or S1307 may be controlled if necessary.

Then, the STA adds a PHY preamble obtained by encoding the long preamble using the encoding information specified by the MU-BAR frame and transmits a resultant MU-BA frame (step S1306).

In summary, according to the processing procedure shown in FIG. 13, the STA, when receiving the MU-BAR, checks whether the individual identifier or the connection identifier written in the contents matches its own identifier. The STA transmits the MU-BA frame only when they match.

The MU-BA is transmitted from the STA at a time when a predetermined time has elapsed from immediately after the STA terminates the reception of the MU-BAR. The interval of the predetermined time is shared between the AP and all the STAs, and it is desirable that the interval prevents the wireless transmission of the third party who is in the communicable range from being interrupted. In the present embodiment, the SIFS or PIFS defined in the IEEE 802.11 wireless LAN standard may be used. During this transmission, it may be possible for each STA not to perform the carrier sensing.

On the AP side, the MU-BA is received simultaneously from each of the specified STAs after the SIFS duration of the MU-BAR transmission. The AP decomposes and restores the MU-BAs simultaneously received from the plurality of STAs using signal processing in flow F1205, for example, in accordance with the processing procedure shown in FIG. 11. If it is not possible to restore a dominant frame for a particular code from a result obtained by performing the restoration process on the MU-BA, it is considered that the STA to which the code is assigned is likely not to receive correctly the MU-BAR and is likely not to transmit the MU-BA. In this case, the AP may retransmit the MU-BAR.

<<Retransmission of Multicast Data>>

The AP, when acquiring the acknowledgement information by separating the acknowledgement response from each of the specified STAs, retransmits the multicast data in flow F1206 depending on the result, if necessary.

The retransmission of the multicast data by the AP may be performed at a time immediately after the acknowledgement response is checked.

When burst-like interference such as a microwave oven is detected, even though the retransmission is previously performed, it is likely to be failed again. In such a case, the AP may add a predetermined delay and then retransmit the multicast data. In the relevant multicast flow (contents), when the request of delay is defined, the AP is assumed to add a delay within a range that does not exceed the defined value.

Third Embodiment

In the third embodiment, the AP does not divide previously the STAs that participate in the multicast group into subgroups. The AP explicitly specifies the STA of the acknowledgement target in the data frame used for the acknowledgement request.

Figure 14:
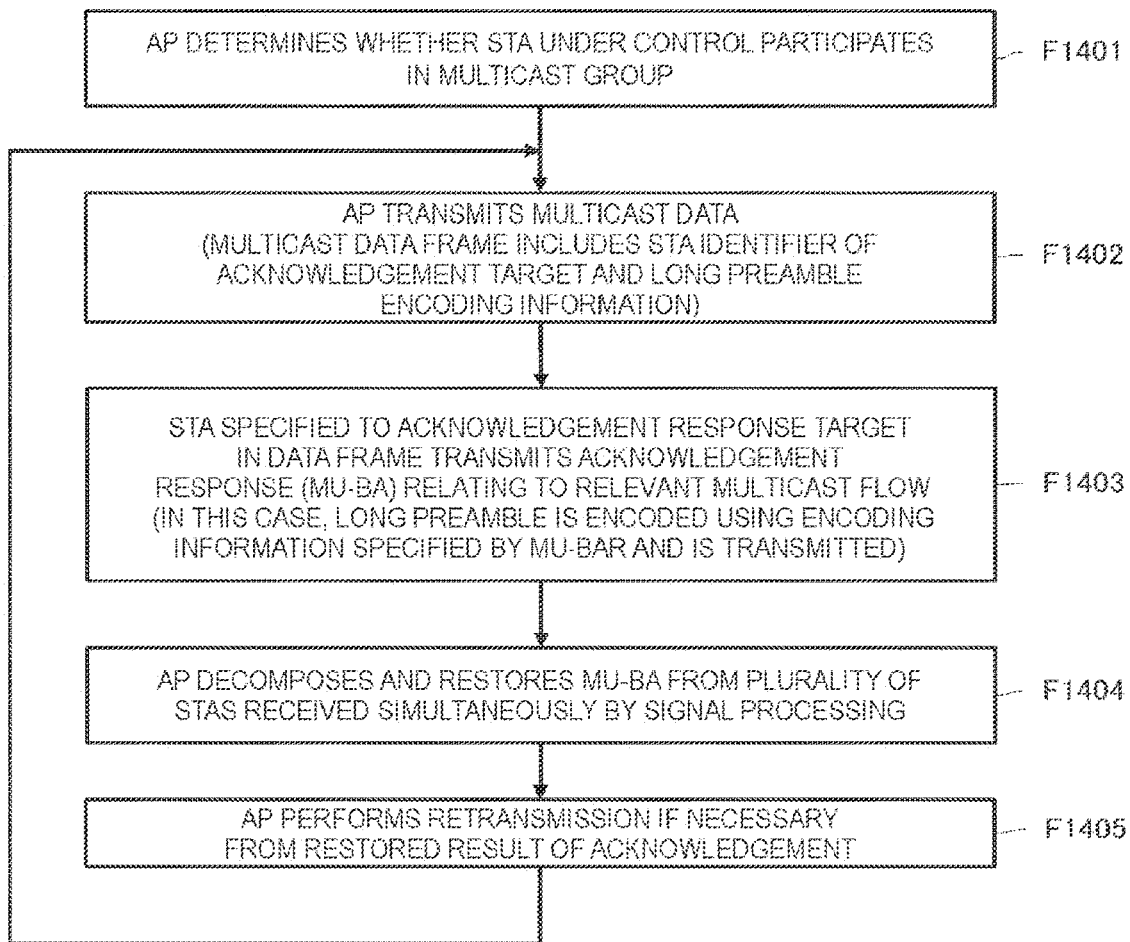
FIG. 14 is a diagram showing the processing flow in a third embodiment.

FIG. 14 shows the processing flow in the third embodiment.

<<Understanding of Multicast Group>>

In flow F1401, each STA that belongs to a multicast group is assumed to participate in a multicast group that is intended to be received previously. The participation in the multicast group is performed using a mechanism such as the IGMP or IPv6 MLD. Each STA receives a multicast address of a multicast group in which each participates.

Each STA participating in the multicast group causes the AP to know whether each participates in the multicast group, and thus each STA notifies whether each is registered in the multicast to the AP in response to the request from the AP or voluntarily. Alternatively, the AP may have a mechanism for analyzing the contents of layer 3 or higher layer to collect information on the multicast participation of the STA that is under the control of the AP.

In the third embodiment, the AP does not perform the creation of the acknowledgement subgroup and the previous notification of the acknowledgement subgroup and the attachment information, which is similar to the second embodiment.

The subsequent processes are performed repeatedly with the transmission or reception of the multicast data. In the present embodiment, the reception or transmission and the acknowledgement of a multicast data frame between AP and multicast group STAs #1 to #6 are performed in accordance with the communication sequence shown in FIG. 15.

<<Transmission and Reception of Multicast Data>>

Figure 15:
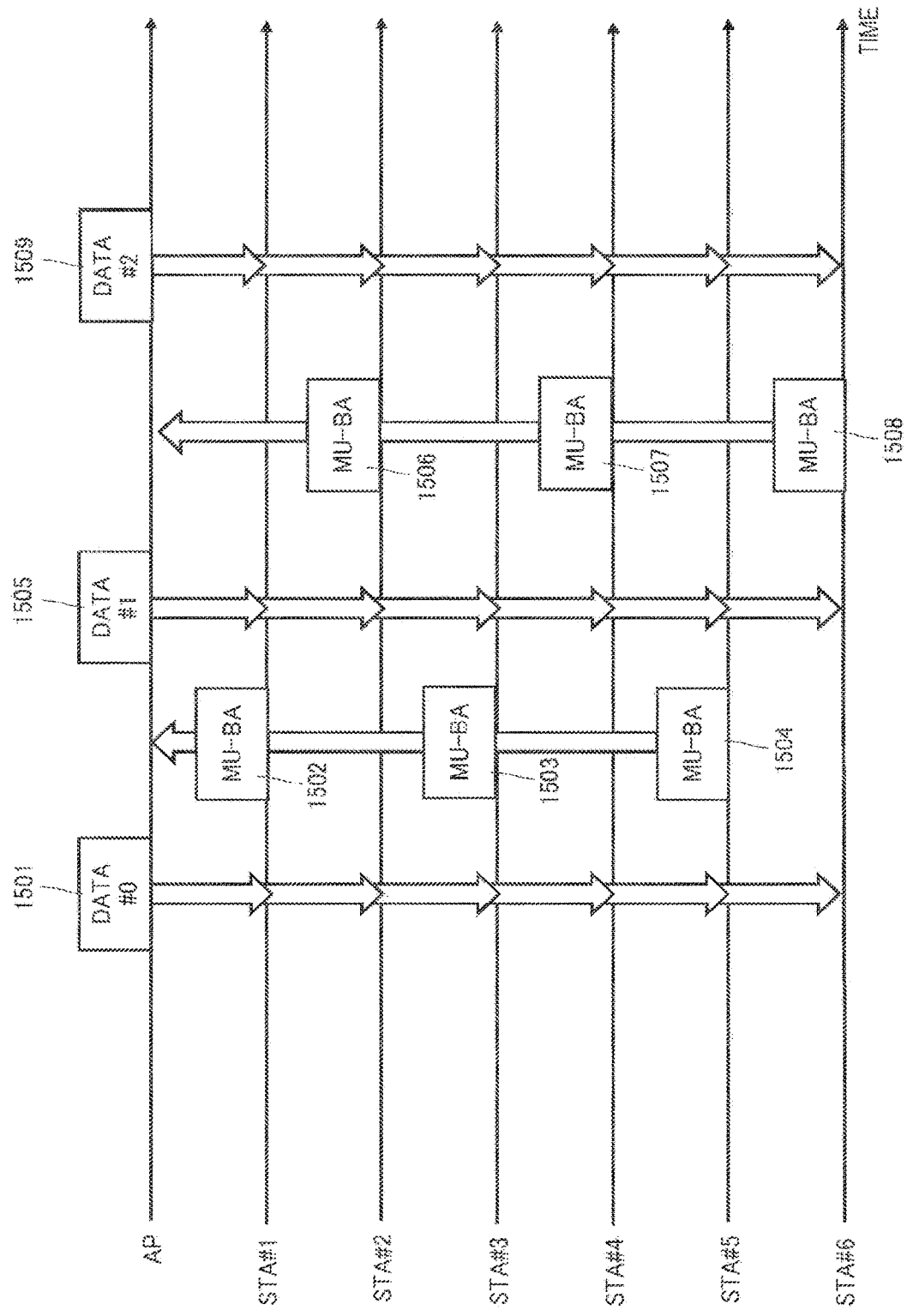
FIG. 15 is a diagram showing an exemplary communication sequence for performing the reception or transmission and the acknowledgement of a multicast data frame between AP and STAs #1 to #6 in the third embodiment.

In flow F1402, the AP transmits sequentially multicast data DATA #0, DATA #1, and DATA #2 to the multicast group STAs #1 to #6, as indicated by reference numbers 1501, 1505, and 1509 in FIG. 15.

In the present embodiment, these multicast data frames are used for the acknowledgement request. The AP extends the MAC header of each of data frames DATA #0, DATA #1, and DATA #2 and writes the STA identifier that requests the MU-BA and the encoding information of long preamble in the MU-BAR frame along with the contents (f1), (f4), and (f5) described above. The AP does not transmit the MU-BAR frame, which is different from the first and second embodiments.

It is possible to use an individual identifier such as a MAC address of the STA or a connection identifier such as an association ID (AID) in the AP, as an identifier for the STA. Examples of the attachment information of the long preamble include long preamble encoding scheme, maximum code length, and identifier of assignment code.

The multicast group member STAs #1 to #6 may hold the reception state of the multicast frame that is at least the acknowledgement target along with the sequence number of the multicast data frame. The multicast group member STAs #1 to #6 correct the frequency offset of a reference oscillator for the AP using the PHY preamble of the multicast data frame.

<<Acknowledgement Response>>

The STA, when receiving the multicast data frames 1501, 1505, and 1509, checks the individual identifier or the connection identifier written in the MAC header matches its own identifier. Then, The STA transmits the MU-BA frame only when they match, as indicated by reference numbers 1502 to 1504 and 1506 to 1508 in FIG. 15. In this case, the STA encodes the long preamble using the encoding information specified in the target multicast data frame (as described above) and transmits it. The STA transmits the MU-BA frame to the AP in response to the fact that the STA receives the data frame to be a target of its own acknowledgement in accordance with the processing procedure shown in FIG. 13. However, the "MU-BAR frame" in step S1301 or the like of FIG. 13 is replaced by "multicast data frame".

The MU-BA is transmitted from the STA at a time when a predetermined time has elapsed from immediately after the STA terminates the reception of the target multicast data frame. The interval of the predetermined time is shared between the AP and all the STAs, and it is desirable that the interval prevents the wireless transmission of the third party who is in the communicable range from being interrupted. In the present embodiment, the SIFS or PIFS defined in the IEEE 802.11 wireless LAN standard may be used. During this transmission, it may be possible for each STA not to perform the carrier sensing.

On the AP side, the MU-BA is received simultaneously from each of the specified STAs after the SIFS duration of the MU-BAR transmission. Then, the AP decomposes and restores the MU-BAs simultaneously received from the plurality of STAs using signal processing in flow F1404, for example, in accordance with the processing procedure shown in FIG. 11.

<<Retransmission of Multicast Data>>

The AP, when acquiring the acknowledgement information by separating the acknowledgement response from each of the specified STAs, retransmits the multicast data in flow F1405 depending on the result, if necessary.

The retransmission of the multicast data by the AP may be performed at a time immediately after the acknowledgement response is checked.

When burst-like interference such as a microwave oven is detected, even though the retransmission is previously performed, it is likely to be failed again. In such a case, the AP may add a predetermined delay and then retransmit the multicast data. In the relevant multicast flow (contents), when the request of delay is defined, the AP is assumed to add a delay within a range that does not exceed the defined value.

Fourth Embodiment

In the fourth embodiment, the AP divides previously the STAs that participate in the multicast group into subgroups. The AP implicitly specifies the STA of the acknowledgement target using an existing parameter value in the data frame used for the acknowledgement request.

Figure 16:
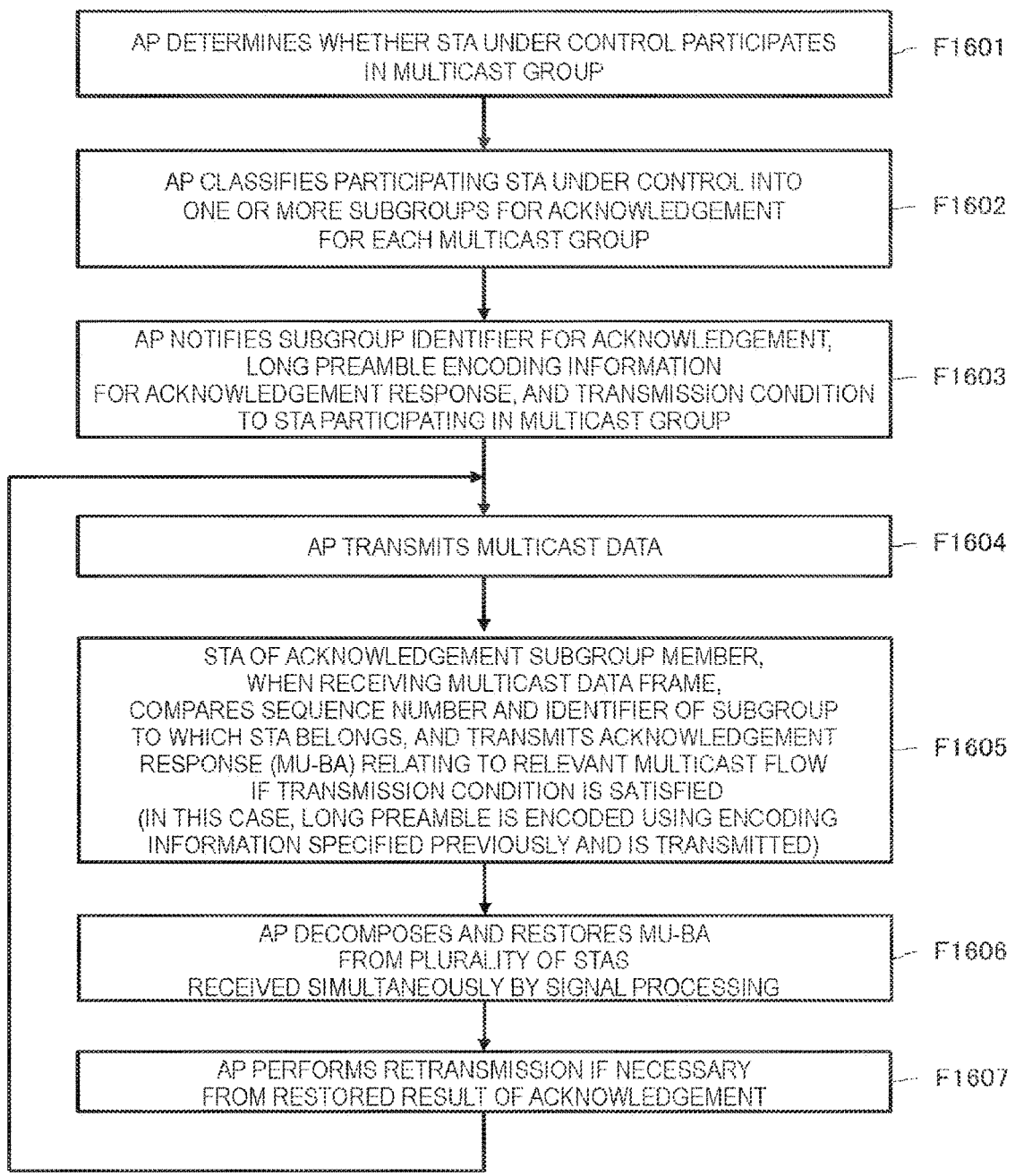
FIG. 16 is a diagram showing the processing flow in a fourth embodiment.

FIG. 16 shows the processing flow in the fourth embodiment.

<<Understanding of Multicast Group>>

In flow F1601, each STA that belongs to a multicast group is assumed to participate in a multicast group that is intended to be received previously. The participation in the multicast group is performed using a mechanism such as the IGMP or IPv6 MLD. Each STA receives a multicast address of a multicast group in which each participates.

Each STA participating in the multicast group causes the AP to know whether each participates in the multicast group, and thus each STA notifies whether each is registered in the multicast to the AP in response to the request from the AP or voluntarily. Alternatively, the AP may have a mechanism for analyzing the contents of layer 3 or higher layer to collect information on the multicast participation of the STA that is under the control of the AP.

<<Creation of Subgroup for Acknowledgement>>

Then, in flow F1602, the AP classifies the participating STA that is under the control of the AP into one or more subgroups for acknowledgement for each multicast group. As described later, the AP requests an acknowledgement only for the subgroup, rather than requesting an acknowledgement for multicast transmission from all the STAs in the multicast group whenever the AP performs multicast transmission.

In the state where the AP determines whether each STA that is under the control of the AP participates in the multicast group in flow F1601, the AP classifies a target STA to be a receiver (referred to as "group member" hereinafter) into a target of acknowledgement and a non-target of acknowledgement with respect to a multicast group. Not all the members in the group are necessarily to be a target of acknowledgement for the multicast flow.

Subsequently, the AP classifies the group members of the acknowledgement target into one or more subgroups. This subgroup becomes a unit of the STA group that simultaneously performs an acknowledgement response of multicast data frames to be transmitted later. Of course, any of the STA groups that simultaneously perform the acknowledgement responses is selected from among multicast group members.

<<Generation of Subgroup Attachment Information and Previous Notification of Acknowledgement Subgroup and Attachment Information>>

The acknowledgement target members are classified into subgroups and then the AP generates attachment information used for the signal separation in the subgroup and a transmission condition that each subgroup transmits the acknowledgement. As the transmission condition, the relationship between the sequence number of the data frames and the subgroup identifier can be used. In the present embodiment, when the relational expression is satisfied between the sequence number of the multicast data frame received in the last by the STA and the following Formula (4), each of the subgroup member transmits the MU-BA.

[Math. 4]

$$\text{SEQUENCE NUMBER OF MULTICAST DATA FRAME mod } 3 = \text{SUBGROUP ID} \quad (4)$$

Then, in flow F1603, the AP previously notifies the information relating to the generated subgroup to the STA of the multicast group using the Ack group assignment frame (described above), beacon frame, or the like. The information of which the AP previously notifies to each member includes a transmission condition of the subgroup in addition to the contents (e1) and (e2) described above.

The group member, when previously receiving the subgroup information, the attachment information (e1) and (e2), and the transmission condition, stores them in a memory of the controller 408 for an example, and uses the acknowledgement response frame (training signal) at the time of transmission.

The processes F1601 to F1603 described above are those relating to previous setup and may be performed at least once.

The subsequent processes F1604 to F1607 are performed repeatedly with the transmission or reception of the multicast data. In the present embodiment, the reception or transmission and the acknowledgement of a multicast data frame between AP and multicast group STAs #1 to #6 are performed in accordance with the communication sequence shown in FIG. 15.

<<Transmission and Reception of Multicast Data>>

In flow F1604, the AP transmits sequentially multicast data DATA #0, DATA #1, and DATA #2 to the multicast group STAs #1 to #6, as indicated by reference numbers 1501, 1505, and 1509 in FIG. 15.

In the present embodiment, these frames of the multicast data are used for the acknowledgement request, and thus the AP does not transmit the MU-BAR frame. It is not necessary to extend the MAC header of each of data frames DATA #0, DATA #1, and DATA #2, which is different from the third embodiment.

<<Acknowledgement Response>>

The STA, when receiving the multicast data frames 1501, 1505, and 1509, in flow F1605, checks whether the transmission condition previously notified in the Ack group assignment frame or beacon frame is satisfied (whether the relational expression (4) is produced between the sequence number and its subgroup identifier). The STA transmits the MU-BA frame as indicated by reference numbers 1502 to 1504 and 1506 to 1508 in FIG. 15, only when the transmission condition is satisfied. In this case, the STA encodes the long preamble using the encoding information specified in the target multicast data frame (as described above) and transmits it. The STA, when transmitting the MU-BA frame, corrects the frequency offset of a reference oscillator for the AP using the PHY preamble of the received multicast data frame.

Figure 17:
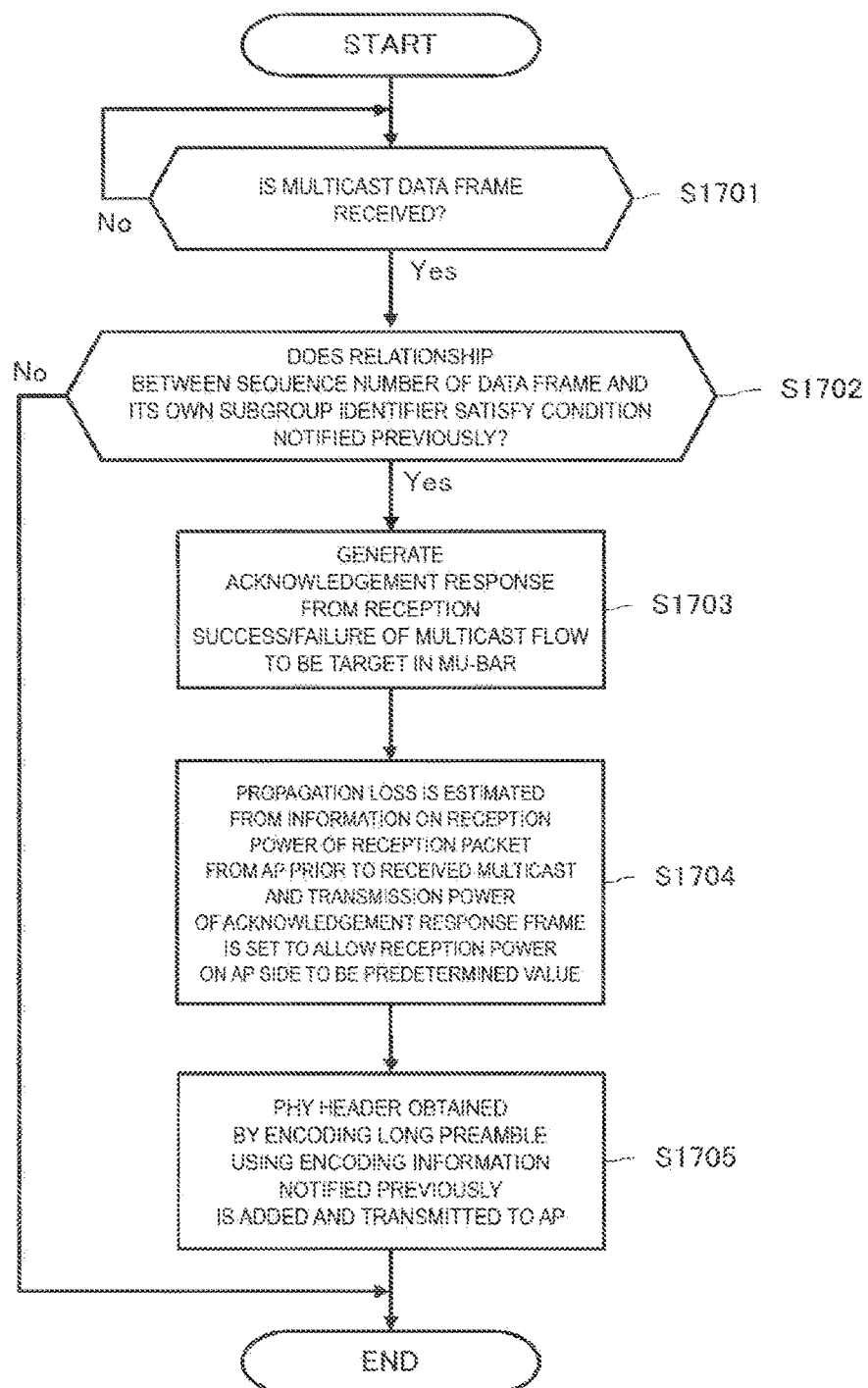
FIG. 17 is a flowchart showing the processing procedure performed in response to the fact that the STA receives a multicast data frame from the AP in the fourth embodiment.

FIG. 17 shows the processing procedure performed in response to the fact that the STA receives a multicast data frame from the AP in flowchart form.

When the STA receives the multicast data frame from the AP (Yes in step S1701), the STA checks whether the transmission condition is satisfied (whether the relational expression (4) is produced between the sequence number of the multicast data frame and its subgroup identifier) (step S1702).

If the transmission condition is not satisfied (No in step S1702), the STA skips all the subsequent processes and terminates this process.

On the other hand, if the transmission condition is satisfied (Yes in step S1702), the STA generates an acknowledgement response MU-BA from a reception success/failure record of the multicast flow to be a target by its multicast data frame (step S1703).

Then, the STA estimates the propagation loss from the information on the previous reception power (the packet previously received from the AP including the relevant multicast data frame, and sets the transmission power of the acknowledgement frame so that the reception power on the AP side becomes a predetermined value (step S1704). This predetermined value is assumed to be shared previously at least among the STAs of the subgroup member.

Then, the STA adds a PHY preamble obtained by encoding the long preamble using the encoding information specified by the multicast data frame and transmits a resultant MU-BA frame (step S1705).

In summary, according to the processing procedure shown in FIG. 17, the STA, when receiving the multicast data frame, checks whether the transmission condition is satisfied. The STA transmits the MU-BA frame only when the transmission condition is satisfied. The multicast data frame is used for the acknowledgement request, and thus the AP is not necessary to transmit the MU-BAR frame. By using the relational expression (4) between the sequence number of the multicast data frame and its subgroup identifier as the transmission condition, and by setting the transmission power when the MU-BA frame is transmitted on the STA side, it is not necessary to extend the MAC header of the multicast data frame.

The MU-BA is transmitted from the STA at a time when a predetermined time has elapsed from immediately after the STA terminates the reception of the target multicast data frame. The interval of the predetermined time is shared between the AP and all the STAs, and it is desirable that the interval prevents the wireless transmission of the third party who is in the communicable range from being interrupted. In the present embodiment, the SIFS or PIFS defined in the IEEE 802.11 wireless LAN standard may be used. During this transmission, it may be possible for each STA not to perform the carrier sensing.

On the AP side, the MU-BA is received simultaneously from each of the specified STAs after the SIFS duration of the multicast data frame transmission. Then, the AP decomposes and restores the MU-BAs simultaneously received from the plurality of STAs using signal processing in flow F1606, for example, in accordance with the processing procedure shown in FIG. 11.

<<Retransmission of Multicast Data>>

The AP, when acquiring the acknowledgement information by separating the acknowledgement response from each of the specified STAs, retransmits the multicast data in flow F1607 depending on the result, if necessary.

The retransmission of the multicast data by the AP may be performed at a time immediately after the acknowledgement response is checked.

When burst-like interference such as a microwave oven is detected, even though the retransmission is previously performed, it is likely to be failed again. In such a case, the AP may add a predetermined delay and then retransmit the multicast data. In the relevant multicast flow (contents), when the request of delay is defined, the AP is assumed to add a delay within a range that does not exceed the defined value.

Fifth Embodiment

In the fifth embodiment, the AP previously acquires channel gain information (CSI) from all the STAs that participate in the multicast group. The AP transmits the acknowledgement request to the group member STA in a frame different from the data frame.

In the use case in which it can be said that there is no movement of the STA and there is little variation in the CSI, even when the CSI is acquired by performing the transmission in the MU-BA format as shown in FIG. 8A or 8B, it is possible to separate the acknowledgement response even though the previous CSI information (result obtained by CSI estimation in the uplink frame such as Association Req) that is held for a relatively long time period.

Figure 18:
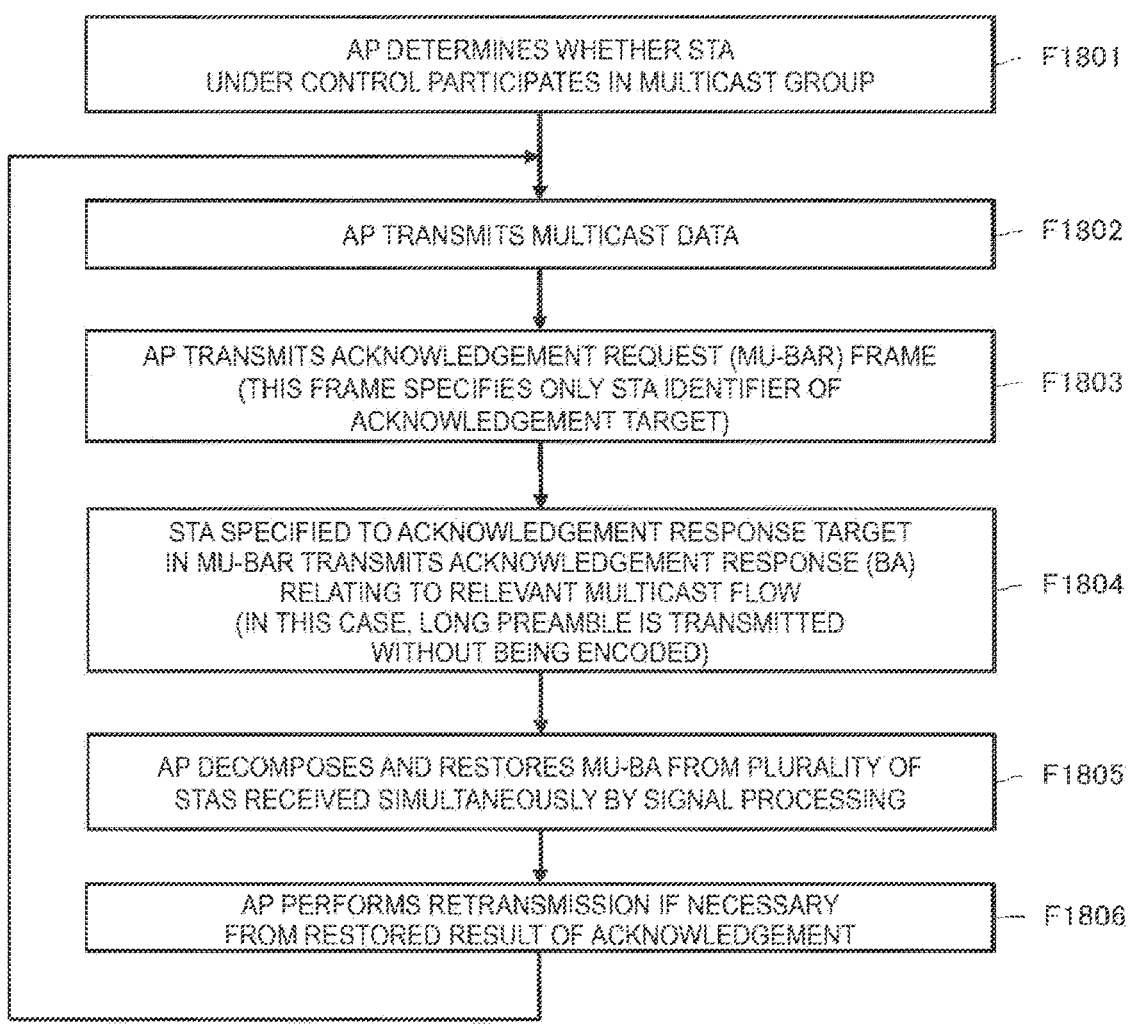
FIG. 18 is a diagram showing the processing flow in a fifth embodiment.

FIG. 18 shows the processing flow in the fifth embodiment.

<<Understanding of Multicast Group>>

In flow F1801, each STA that belongs to a multicast group is assumed to participate in a multicast group that is intended to be received previously. The participation in the multicast group is performed using a mechanism such as the IGMP or IPv6 MLD. Each STA receives a multicast address of a multicast group in which each participates.

Each STA participating in the multicast group causes the AP to know whether each participates in the multicast group, and thus each STA notifies whether each is registered in the multicast to the AP in response to the request from the AP or voluntarily. Alternatively, the AP may have a mechanism for analyzing the contents of layer 3 or higher layer to collect information on the multicast participation of the STA that is under the control of the AP.

In the fifth embodiment, the AP does not create the acknowledgement subgroup. The previous notification of the acknowledgement subgroup and the attachment information is not performed.

Figure 19:
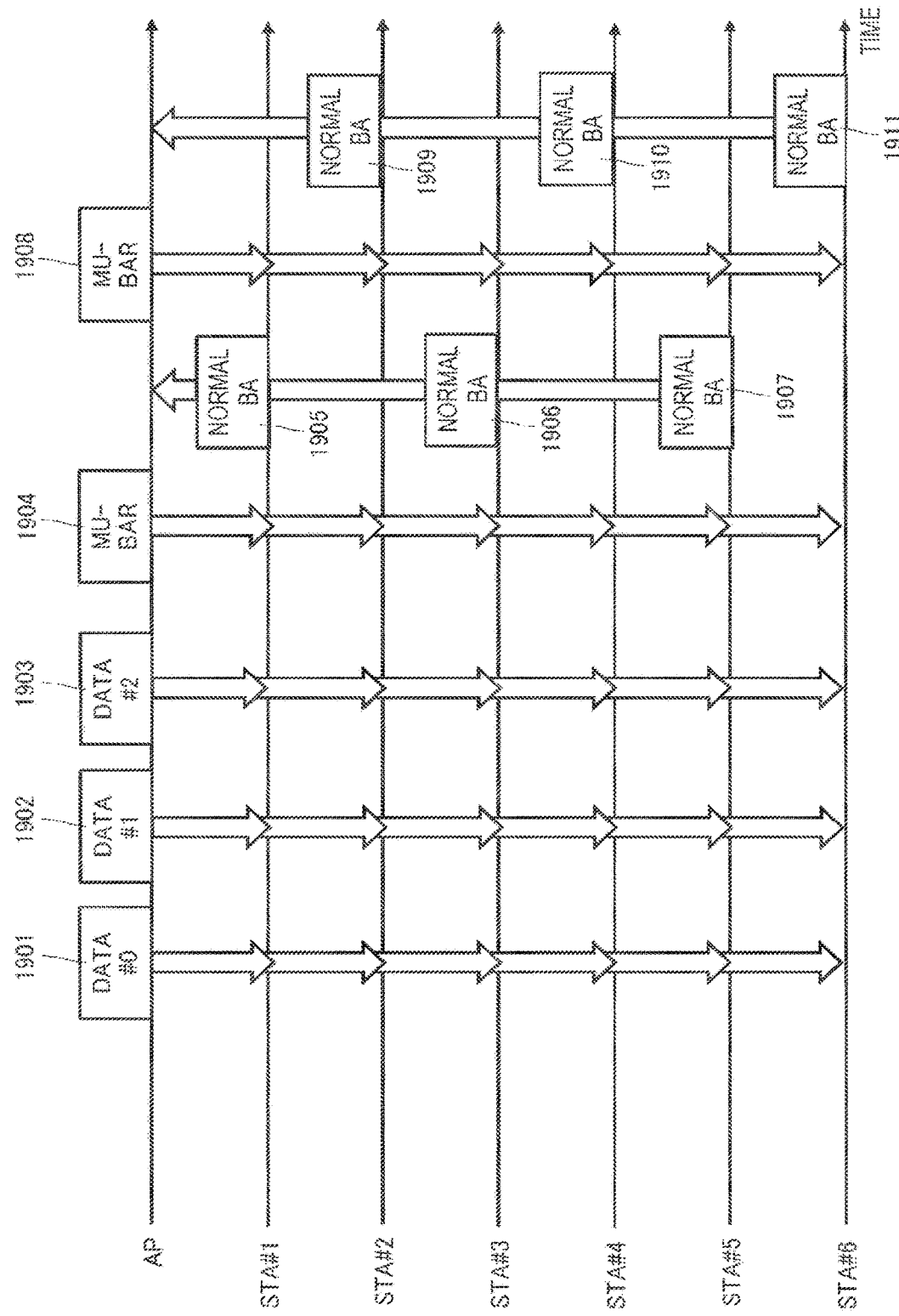
FIG. 19 is a diagram showing an exemplary communication sequence for performing the reception or transmission and the acknowledgement of a multicast data frame between AP and STAs #1 to #6 in the fifth embodiment.

The subsequent processes are performed repeatedly with the transmission and reception of the multicast data. FIG. 19 shows an exemplary communication sequence for performing the reception or transmission and the acknowledgement of a multicast data frame between AP and STAs #1 to #6 in the present embodiment.

<<Transmission and Reception of Multicast Data>>

In flow F1802, the AP transmits sequentially multicast data DATA #0, DATA #1, and DATA #2 to the multicast group STAs #1 to #6, as indicated by reference numbers 1901 to 1903 in FIG. 19. The frame of these multicast data is transmitted using a normal frame format as shown in FIG. 7 without performing the encoding described above.

The multicast group member STAs #1 to #6 may hold the reception state of individual multicast frame for each sequence number of the multicast data frame. The multicast group member STAs #1 to #6 correct the frequency offset of a reference oscillator for the AP using the PHY preamble of the multicast data frame.

<<Acknowledgement>>

In the present embodiment, the AP transmits one or more multicast data frames and then transmits the MU-BAR frame that requests the acknowledgement as indicated by reference numbers 1904 and 1908 in FIG. 19 in flow F1803. In the present embodiment, the AP writes the STA identifier that requests the acknowledgement response BA in the MU-BAR frame along with the contents (f1), (f4), and (f5) described above. It is possible to use an individual identifier such as a MAC address of the STA or a connection identifier such as an association ID (AID) in the AP, as an identifier for the STA. The AP previously acquires CSI information from all the STAs that participate in the multicast group, and thus it is not necessary to transmit the encoding information of the long preamble in the MU-BAR frame.

The AP may transmit MU-BAR as a single wireless packet in a wireless section by performing the aggregation at the MAC layer using the multicast data and the A-MPDU in addition to transmission of only MU-BAR as a single wireless packet as shown in FIG. 19 (this is similar to the above).

Each of the STAs in which the MU-BA is specified to be requested using the individual identifier or the connection identifier in the MU-BAR frame, when receiving the MU-BAR frames 1904 and 1908 from the AP, transmits the acknowledgement response BA frame relating to the relevant multicast flow as indicated by reference numbers 1905 to 1907 and 1909 to 1911 in FIG. 19 in flow F1804.

Although the acknowledgement response BA frame to be transmitted is different from the MU-BAR frame that is encoded by the long preamble in that the normal preamble format shown in FIG. 7 is used, the contents subsequent to the PHY header are similar to the MU-BA frame.

Figure 20:
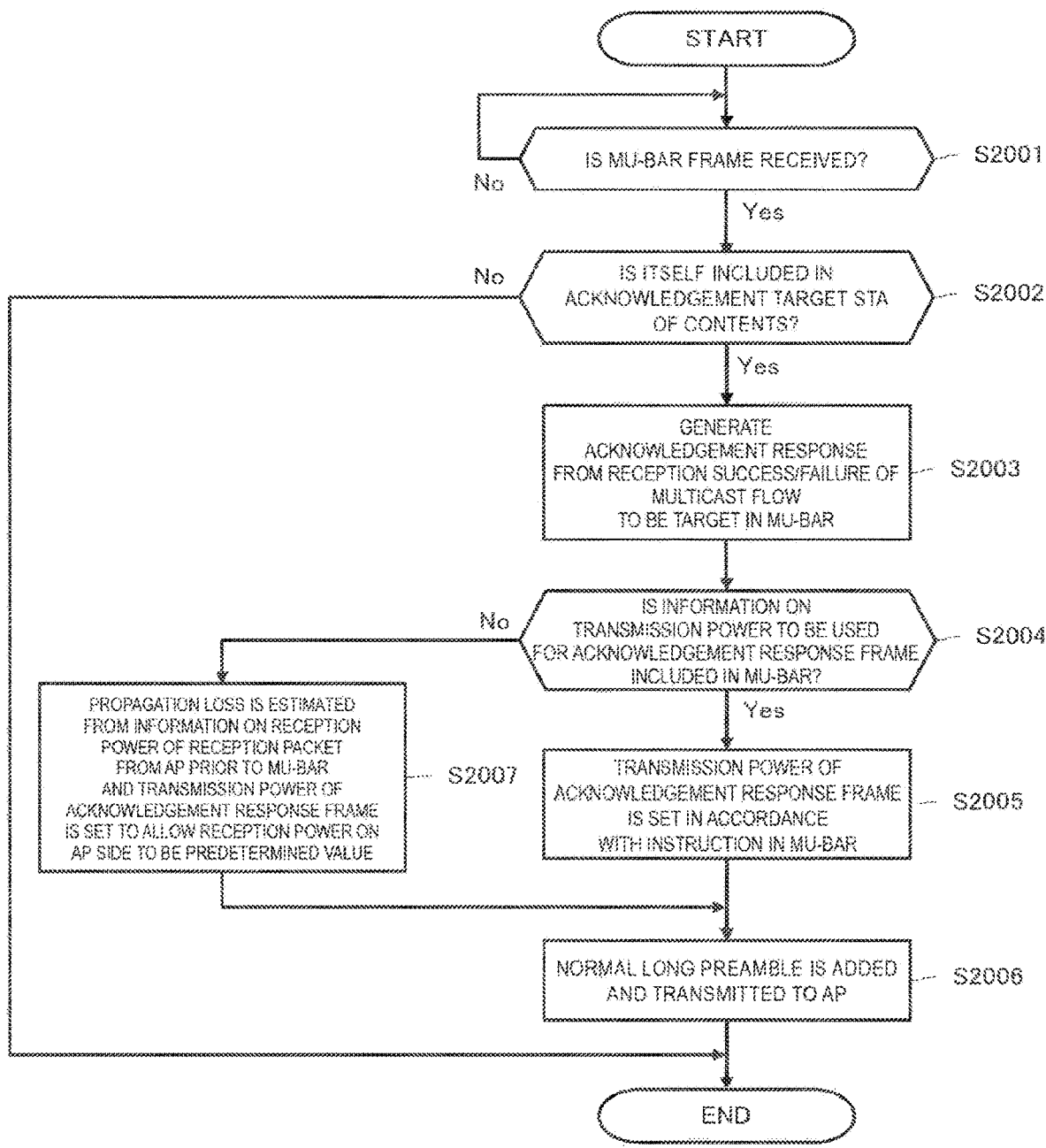
FIG. 20 is a flowchart showing the processing procedure performed in response to the fact that the STA receives an MU-BAR frame from the AP in the fifth embodiment.

FIG. 20 shows showing the processing procedure performed in response to the fact that the STA receives an MU-BAR frame from the AP in the first embodiment in flowchart form.

The STA, when receiving the MU-BAR frame from the AP (Yes in step S2001), checks whether its own individual identifier or connection identifier is specified in the MU-BAR frame (step S2002).

If its own individual identifier or connection identifier is not specified (No in step S2002), the STA skips all the subsequent processes and terminates this process.

On the other hand, if its own individual identifier or connection identifier is specified (Yes in step S2002), the STA generates an acknowledgement response BA from a reception success/failure record of the multicast flow to be a target by the MU-BAR frame (step S2003).

The STA includes reception success/failure information for each sequence number in the target multicast flow in the acknowledgement response BA frame to be generated. Although the multicast flow transmitted from the AP before the MU-BAR frame is received is the target, it is not necessary to include information having a number preceding the starting sequence number notified in the MU-BAR frame. In the STA, even when there is a retransmission request and the request is arrived, the frame, which can be determined that there is no value in use at the higher layer of the STA, though it is not received, may be notified as a success in the determination by the STA.

Then, the STA checks whether information on transmission power to be used in the acknowledgement response BA frame is included in the MU-BAR frame (step S2004).

If the information on transmission power to be used in the acknowledgement response BA frame is included in the MU-BAR frame (Yes in step S2004), the STA sets the transmission power to be used in the acknowledgement response BA frame in accordance with an instruction in the MU-BAR frame (step S2005).

If the information on transmission power to be used in the acknowledgement response BA frame is not included in the MU-BAR frame (No in step S2004), the STA estimates the propagation loss from the information on the previous transmission power (the packet previously received from the AP including MU-BAR) and sets the transmission power of the acknowledgement response BA frame so that the reception power on the AP side becomes a predetermined value (step S2007). The predetermined value is assumed to be shared previously at least among the subgroup member STAs.

The power to be used for transmission of the acknowledgement response BA in step S2005 or S2007 may be controlled if necessary.

Then, the STA adds a PHY preamble obtained by encoding the long preamble using the encoding information specified by the MU-BAR frame and transmits a resultant acknowledgement response BA frame (step S2006).

In summary, according to the processing procedure shown in FIG. 20, the STA, when receiving the MU-BAR, checks whether the individual identifier or the connection identifier written in the contents matches its own identifier. The STA transmits the BA frame in which the long preamble is not encoded only when they match.

The acknowledgement response BA is transmitted from the STA at a time when a predetermined time has elapsed from immediately after the STA terminates the reception of the MU-BAR. The interval of the predetermined time is shared between the AP and all the STAs, and it is desirable that the interval prevents the wireless transmission of the third party who is in the communicable range from being interrupted. In the present embodiment, the SIFS or PIFS defined in the IEEE 802.11 wireless LAN standard may be used. During this transmission, it may be possible for each STA not to perform the carrier sensing.

On the AP side, the acknowledgement response BA is received simultaneously from each of the specified STAs after the SIFS duration of the MU-BAR transmission. Then, the AP decomposes and restores the acknowledgement response BAs simultaneously received from the plurality of STAs using signal processing in flow F1805.

Figure 21:
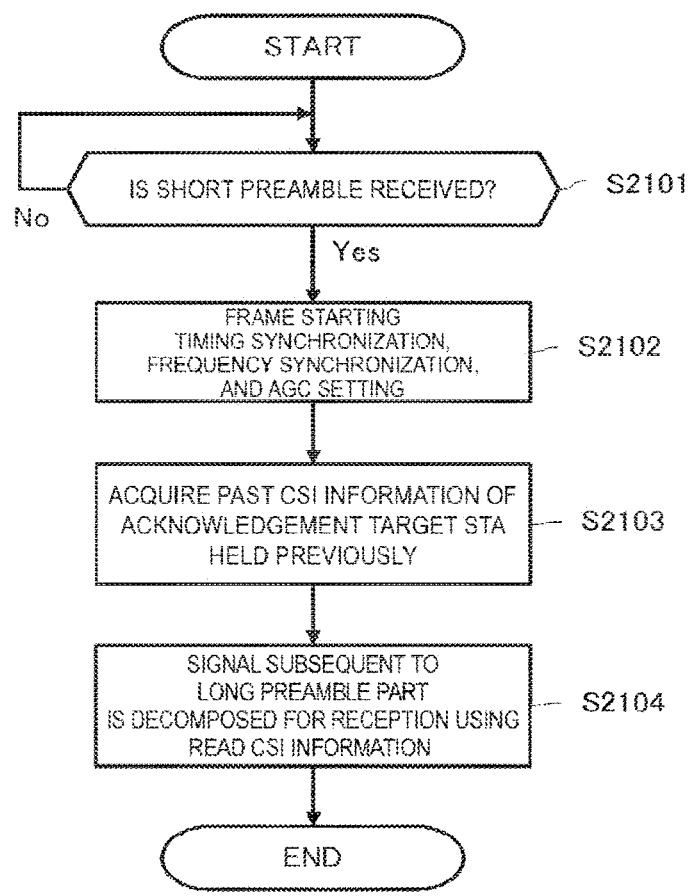
FIG. 21 is a flowchart showing the processing procedure for receiving MU-BA from the STA specified by the AP.

FIG. 21 shows the procedure of a process for receiving an acknowledgement response BA from a subgroup member specified by the AP in flowchart form. The AP, after transmitting the MU-BAR, waits for the acknowledgement response BA frame from the subgroup and performs a process different from a normal reception process.

When the AP detects a short preamble (Yes in step S2101), the reception signal processed in the respective wireless interface units 306-1, . . . is sent to the channel estimation unit 395, and the synchronization of frame staring timing, frequency synchronization, and setting of auto gain control are performed in the short preamble portion (step S2102).

Then, the spatial signal processing unit 304 reads out the previous CSI information of each STA of the acknowledgement target which is previously stored (step S2103), and restores (decomposes) the acknowledgement response BA from each STA using the CSI information (step S2104). The decomposition process is applied to the signal subsequent to the long preamble part (i.e., subsequent to the PHY header).

<<Retransmission of Multicast Data>>

The AP, when acquiring the acknowledgement information by separating the acknowledgement response BA from each of the specified STAs, retransmits the multicast data in flow F1806 depending on the result, if necessary.

The retransmission of the multicast data by the AP may be performed at a time immediately after the acknowledgement response BA is checked.

When burst-like interference such as a microwave oven is detected, even though the retransmission is previously performed, it is likely to be failed again. In such a case, the AP may add a predetermined delay and then retransmit the multicast data. In the relevant multicast flow (contents), when the request of delay is defined, the AP is assumed to add a delay within a range that does not exceed the defined value.

The previous subgrouping and notification as described in the first embodiment may also be used in the scheme according to the present embodiment. In this case, the subgroup identifier is reported instead of the STA identifier in the contents (payload) of the MU-BAR.

Also in the present embodiment, the acknowledgement may be notified using the multicast data frame instead of the MU-BAR, which is similar to the third and fourth embodiments.

According to the first to fifth embodiments, it is possible to improve the reliability of delivery while reducing the radio resources to be used for acknowledgement in wireless multicast distribution even when there are a plurality of receiving terminals.

INDUSTRIAL APPLICABILITY

It should be understood by those skilled in the art that various modifications, combinations, sub-combinations and alterations may occur depending on design requirements and other factors insofar as they are within the scope of the appended claims or the equivalents thereof.

While embodiments have been mainly described in which the present technology disclosed herein is applied to a wireless communication system based on the IEEE 802.11 based wireless LAN standard, the spirit and scope of the present technology disclosed herein are not limited thereto. When the multicast transmission is performed in the wireless communication system based on other various wireless standards, the application of the present technology disclosed herein makes it possible to improve the reliability using the acknowledgement response while using radio resources efficiently. As one example, when the present technology disclosed herein is applied to a wireless communication system based on the Wi-Fi Direct standard, the access point (AP) may be interchangeably used with a group owner (GO), and the station (STA) may be interchangeably used with a client.

In short, the present technology has been disclosed in a form of illustration and should not be interpreted limitedly. To determine the gist of the present disclosure, patent claims should be taken into account.

Additionally, the present technology may also be configured as below.

(1)
A wireless communication device including:
  a communication unit configured to communicate wirelessly with a plurality of slave stations under control; and
  a controller configured to control data transmission with each of the slave stations via the communication unit, wherein the controller allows the communication unit serving as a master station to perform multicast transmission to the plurality of slave stations and to request an acknowledgement for the multicast transmission from the slave station, and
  the communication unit performs a process of receiving an acknowledgement response simultaneously transmitted from the plurality of slave stations.

(1-1)
A wireless communication method including:
  serving as a master station to perform multicast transmission to a plurality of slave stations;
  requesting an acknowledgement from the slave station to be a target for the multicast transmission; and
  performing a process of receiving an acknowledgement response simultaneously transmitted from the plurality of slave stations.

(1-2)
The wireless communication device according to (1),
wherein the communication unit transmits a frame requesting the acknowledgement from the slave station by aggregation of the frame with a multicast data frame.

(2)
The wireless communication device according to (1),
wherein the controller requests an acknowledgement selectively from among the slave stations participating in a multicast group transmitted by multicast.

(2-1)
The wireless communication device according to (2),
wherein the controller requests the acknowledgement selectively based on a state in which whether each of the slave stations participates in the multicast group is determined.

(2-2)
The wireless communication device according to (2),
wherein the controller requests the acknowledgement selectively based on communication quality obtained from the previous transmission or reception for each of the slave stations.

(2-3)
The wireless communication device according to (2),
wherein the controller requests the acknowledgement selectively from the slave station necessitating reliability for multicast.

(2-4)
The wireless communication device according to (2),
wherein the controller classifies the slave station from which the acknowledgement is to be requested into subgroups and requests the acknowledgement in a subgroup unit.

(2-4-1)
The wireless communication device according to (2-4),
wherein the controller sets a maximum number of the slave stations participating in the subgroup.

(2-4-1-1)
The wireless communication device according to (2-4-1),
wherein the controller sets the maximum number of the slave stations based on the number of signals that can be simultaneously received and separated by the communication unit.

(2-4-2)
The wireless communication device according to (2-4),
wherein the controller classifies a combination to be easily subjected to signal separation based on wireless channel state information into subgroups.

(2-4-3)
The wireless communication device according to (2-4), wherein the controller classifies a combination allowing a difference between reception levels in the communication unit to be small into subgroups.

(2-4-4)
The wireless communication device according to (2-4), wherein the controller causes the communication unit to previously notify subgroup identification information to the slave station participating in the subgroup using a management frame or a beacon frame.

(2-5)
The wireless communication device according to (1), wherein the controller causes the slave station to report a request of an acknowledgement using a different frame from a multicast frame.

(2-6)
The wireless communication device according to (1), wherein the controller causes the slave station to report a request of an acknowledgement using a portion of a multicast frame.

(2-7)
The wireless communication device according to (2), wherein the wireless communication device reports that the slave station is a destination of a request of an acknowledgement using an individual identifier or a connection identifier of the slave station to be a target.

(2-8)
The wireless communication device according to (2), wherein the wireless communication device classifies the slave station from which the acknowledgement is to be requested into subgroups and reports that the slave station is a destination of a request of an acknowledgement to the slave station belonging to the subgroup using subgroup identification information when the subgroup identification information is previously notified to the slave station participating in the subgroup.

(2-9)
The wireless communication device according to (2), wherein the controller determines whether to cause the communication unit to transmit the acknowledgement response frame on a basis of a combination of a sequence number of a received multicast data frame and subgroup identification information notified previously from the master station.

(3)
The wireless communication device according to (1), wherein the controller specifies one of a slave station transmitting an acknowledgement response frame and a transmission scheme of the acknowledgement response frame via the communication unit, and
the communication unit separates a plurality of acknowledgement response frames received simultaneously from the plurality of slave stations on a basis of information on a propagation path between the plurality of slave stations and the wireless communication device.

(4)
The wireless communication device according to (3), wherein the specification of the transmission scheme includes an encoding scheme of a training signal of the acknowledgement response frame used to form a format capable of separating the frames transmitted simultaneously from the plurality of slave stations using calculation, and
the communication unit acquires the information on the propagation path between each of the slave stations and the wireless communication device from the training signal transmitted from each of the slave stations in accordance with the encoding scheme.

(4-1)
The wireless communication device according to (4), wherein the communication unit acquires information on a propagation path between each of the slave stations and the communication unit by extracting a training signal of each of the slave stations from the training signal subject to quadrature encoding included in a portion of the acknowledgement response frame.

(4-2)
The wireless communication device according to (4), wherein the communication unit acquires information on a propagation path between each of the slave stations and the communication unit by extracting a training signal of each of the slave stations from the training signal subject to time division transmission included in a portion of the acknowledgement response frame.

(5)
The wireless communication device according to (3), wherein the specification of the transmission scheme includes information on a combination of a modulation method and error correction coding for the acknowledgement response frame.

(6)
The wireless communication device according to (3), wherein the specification of the transmission scheme includes information on transmission power of the acknowledgement response frame.

(7)
The wireless communication device according to (3), wherein the controller, when classifying the slave station from which an acknowledgement is to be requested into subgroups, notifies the specification of the transmission scheme in a management frame or a beacon frame that contains subgroup identification information notifying that the slave station is a member of the subgroup.

(7-1)
The wireless communication device according to (7), wherein the controller, when an encoding scheme of the training signal part of the acknowledgement response frame is included in the transmission scheme, assigns the encoding scheme of the training signal to each of the slave stations in such a way as not to overlap in the subgroup.

(8)
The wireless communication device according to (3), wherein the controller notifies the specification of the transmission scheme in a frame requesting an acknowledgement.

(9)
A wireless communication device including:
a communication unit configured to communicate wirelessly with a master station; and
a controller configured to control data transmission with the master station via the communication unit,
wherein the communication unit receives a frame transmitted by multicast to a multicast group including the wireless communication device, and
the controller, when a predetermined condition is satisfied, allows the communication unit to transmit an acknowledgement response after a lapse of a predetermined time from reception of the frame transmitted by multicast.

(9-1)
A wireless communication method including:
receiving a frame transmitted by multicast to a multicast group including a wireless communication device; and
when a predetermined condition is satisfied, transmitting an acknowledgement response after a lapse of a predetermined time from reception of the frame transmitted by multicast.

(9-2)
The wireless communication device according to (9), wherein the controller causes the acknowledgement response to be transmitted from the communication unit after a lapse of a predetermined time from reception of a multicast frame to be a target in response to reception of a frame requesting an acknowledgement for multicast transmission from the master station to the wireless communication device.

(10)
The wireless communication device according to (9), wherein the communication unit transmits an acknowledgement response frame using a transmission scheme of the acknowledgement response frame specified from the master station.

(11)
The wireless communication device according to (10), wherein the communication unit encodes a training signal of the acknowledgement response frame in accordance with the specification from the master station, and transmits the encoded training signal.

(11-1)
The wireless communication device according to (10), wherein the communication unit encodes a training signal by the encoding scheme reported in the frame requesting the acknowledgement, and transmits the encoded training signal.

(11-2)
The wireless communication device according to (10), wherein the communication unit, when an acknowledgement is requested selectively from among the slave stations participating in the multicast group transmitted by multicast, encodes a training signal by the encoding scheme assigned in such a way as not to overlap with another slave station in the group, and transmits the encoded training signal.

(12)
The wireless communication device according to (10), wherein the communication unit determines a combination of a modulation method and error correction coding to be used for the acknowledgement response frame in accordance with the specification from the master station.

(12-1)
The wireless communication device according to (10), wherein the communication unit determines a combination of a modulation method and error correction coding to be used for the acknowledgement response frame in accordance with a description in the frame requesting the acknowledgement from the master station to the wireless communication device.

(13)
The wireless communication device according to (10), wherein the communication unit sets transmission power in accordance with an instruction from the master station and transmits the acknowledgement response.

(14)
The wireless communication device according to (9), wherein the controller allows the communication unit to transmit the acknowledgement response frame when an individual identifier or a connection identifier of the wireless communication device is specified in a multicast data frame received from the master station or a frame requesting an acknowledgement.

(15)
The wireless communication device according to (9), wherein the controller, when the wireless communication device is specified to be included in a target in subgroup identification information notified previously from the master station in a multicast data frame received from the master station or a frame requesting an acknowledgement, allows the communication unit to transmit the acknowledgement response frame.

(16)
The wireless communication device according to (9), wherein the controller determines whether to cause the communication unit to transmit the acknowledgement response frame on a basis of a relationship between a sequence number of a received multicast data frame and subgroup identification information notified previously from the master station.

(17)
The wireless communication device according to (10), wherein the communication unit sets transmission power in such a way that received power in the master station is predetermined power on a basis of a result obtained by estimating an amount of attenuation on a propagation path between the wireless communication device and the master station, and transmits the acknowledgement response.

(18)
The wireless communication device according to (1), wherein the wireless communication device operates as an access point supporting IEEE 802.11 standard or a group owner (GO) supporting Wi-Fi direct standard.

(19)
The wireless communication device according to (9), wherein the wireless communication device operates as a station supporting IEEE 802.11 standard or a client supporting Wi-Fi direct standard.

(20)
A wireless communication system including:
a master station configured to perform multicast transmission to a plurality of slave stations, a request of an acknowledgement to the slave station for the multicast transmission, and a process of receiving an acknowledgement response transmitted simultaneously from the plurality of slave stations; and
the plurality of slave stations configured to receive a frame transmitted by multicast to a multicast group including the slave station and to transmit the acknowledgement response after a lapse of a predetermined time from reception of the frame transmitted by multicast when a predetermined condition is satisfied.

REFERENCE SIGNS LIST

100 data transmission system
110 wireless slave station
120 wireless master station
130 multicast distribution server
140 backbone network
201 data source
202 data processing unit
203 backbone communication unit 301 backbone communication unit
302 data processing unit
303 modulation-demodulation unit
304 spatial signal processing unit
305 channel estimation unit
306 wireless interface unit
307 antenna
308 controller

The invention claimed is:

1. An access point device comprising:
circuitry configured to
transmit an acknowledgement request frame for data transmission to a first station device and a second station device; and
receive respective acknowledgement response frames simultaneously transmitted from the first station device and the second station device, wherein
the circuitry is further configured to
specify, by the acknowledgement request frame, an encoding scheme of training signals of the acknowledgement response frames used to form a format capable of separating the acknowledgement response frames transmitted simultaneously from the first station device and the second station device using calculation;
acquire first information on a first propagation path between the first station device and the access point device from a first training signal of the training signals transmitted from the first station device in accordance with the encoding scheme;
acquire second information on a second propagation path between the second station device and the access point device from a second training signal of the training signals transmitted from the second station device in accordance with the encoding scheme; and
separate the acknowledgement response frames received simultaneously from the first station device and the second station device on a basis of the first information and the second information.

2. The access point device according to claim 1, wherein the data transmission and the acknowledgement request frame are subject to multicast.

3. The access point device according to claim 1, wherein the circuitry is configured to specify, by the acknowledgement request frame, the transmission scheme that includes at least one of information on a combination of a modulation method and error correction coding for the acknowledgement response frames and information on transmission power of the acknowledgement response frames.

4. A station device comprising:
circuitry configured to
receive an acknowledgement request frame for data reception transmitted from the access point device to the station device, the acknowledgement request frame requesting an acknowledgement response frame; and
transmit the acknowledgement response frame simultaneously with another acknowledgement response frame transmitted from another station device after a lapse of a predetermined time from reception of the acknowledgement request frame transmitted from the access point device, wherein
the circuitry is configured to transmit the acknowledgement response frame using an encoding scheme of a training signal of the acknowledgement response frame specified from the access point device by the acknowledgement request frame, the encoding scheme of the training signal of the acknowledgement response frame being used to form a format capable of separating the acknowledgement response frame and the another acknowledgement response frame transmitted simultaneously from the station device and the another station device using calculation, and wherein
the circuitry is configured to encode the training signal in accordance with the encoding scheme and transmit the encoded training signal.

5. The station device according to claim 4,
wherein a transmission scheme is specified from the access point device by the acknowledgement request frame, the transmission scheme including information on a combination of a modulation method and error correction coding for the acknowledgement response frame, and
the circuitry is configured to determine the combination of the modulation method and the error correction coding to be used for the acknowledgement response frame in accordance with the transmission scheme.

6. The station device according to claim 4,
wherein the transmission scheme includes information on transmission power of the acknowledgement response frame, and
the circuitry is configured to determine the transmission power to be used for the acknowledgement response frame in accordance with the transmission scheme.

7. The station device according to claim 4,
wherein the circuitry is configured to transmit the acknowledgement response frame when one of an individual identifier and a connection identifier of the wireless communication device is specified in at least one of a data frame received from the access point device or the acknowledgement request frame.

8. The station device according to claim 4,
wherein the circuitry is configured to set transmission power in such a way that received power in the access point device is a predetermined power on a basis of a result obtained by estimating an amount of attenuation on a propagation path between the station device and the access point device, and transmits the acknowledgement response frame.

9. The station device according to claim 4,
wherein the data reception and the acknowledgement request frame are subject to multicast.

* * * * *